US008732386B2

(12) United States Patent
O'Krafka et al.

(10) Patent No.: US 8,732,386 B2
(45) Date of Patent: May 20, 2014

(54) SHARING DATA FABRIC FOR COHERENT-DISTRIBUTED CACHING OF MULTI-NODE SHARED-DISTRIBUTED FLASH MEMORY

(75) Inventors: Brian Walter O'Krafka, Austin, CA (US); Michael John Koster, Bridgeville, CA (US); Darpan Dinker, Union City, CA (US); Earl T. Cohen, Oakland, CA (US); Thomas M. McWilliams, Oakland, CA (US)

(73) Assignee: Sandisk Enterprise IP LLC., Milpitas, CA (US)

( * ) Notice: Subject to any disclaimer, the term of this patent is extended or adjusted under 35 U.S.C. 154(b) by 929 days.

(21) Appl. No.: 12/197,899

(22) Filed: Aug. 25, 2008

(65) Prior Publication Data
US 2009/0240869 A1 Sep. 24, 2009

Related U.S. Application Data

(63) Continuation-in-part of application No. 12/130,661, filed on May 30, 2008, now Pat. No. 7,975,109.

(60) Provisional application No. 61/038,336, filed on Mar. 20, 2008.

(51) Int. Cl.
*G06F 12/00* (2006.01)
(52) U.S. Cl.
USPC .................. 711/103; 711/148; 711/E12.008
(58) Field of Classification Search
USPC .................................. 711/103, 148, E12.008
See application file for complete search history.

(56) References Cited

U.S. PATENT DOCUMENTS

| | | | |
|---|---|---|---|
| 4,916,605 | A | 4/1990 | Beardsley et al. |
| 5,046,002 | A | 9/1991 | Takashi et al. |
| 5,057,996 | A | 10/1991 | Cutler et al. |
| 5,117,350 | A | 5/1992 | Parrish et al. |
| 5,212,789 | A | 5/1993 | Rago |
| 5,287,496 | A | 2/1994 | Chen et al. |
| 5,297,258 | A | 3/1994 | Hale et al. |

(Continued)

FOREIGN PATENT DOCUMENTS

| | | |
|---|---|---|
| EP | 1548600 B1 | 1/2007 |
| EP | 1746510 A1 | 1/2007 |

OTHER PUBLICATIONS

Bsn-modulestore, Versioning Concept, Oct. 13, 2010, 2 pgs.
Btrfs, http://en.wikipedia.org, Oct. 3, 2011, 9 pgs.

(Continued)

*Primary Examiner* — Larry Mackall
(74) *Attorney, Agent, or Firm* — Morgan, Lewis & Bockius LLP

(57) ABSTRACT

A Sharing Data Fabric (SDF) causes flash memory attached to multiple compute nodes to appear to be a single large memory space that is global yet shared by many applications running on the many compute nodes. Flash objects stored in flash memory of a home node are copied to an object cache in DRAM at an action node by SDF threads executing on the nodes. The home node has a flash object map locating flash objects in the home node's flash memory, and a global cache directory that locates copies of the object in other sharing nodes. Application programs use an applications-programming interface (API) into the SDF to transparently get and put objects without regard to the object's location on any of the many compute nodes. SDF threads and tables control coherency of objects in flash and DRAM.

24 Claims, 15 Drawing Sheets

(56) References Cited

U.S. PATENT DOCUMENTS

| | | | |
|---|---|---|---|
| 5,394,555 A | 2/1995 | Hunter et al. | |
| 5,403,639 A | 4/1995 | Belsan et al. | |
| 5,423,037 A | 6/1995 | Hvasshovd | |
| 5,509,134 A | 4/1996 | Fandrich et al. | |
| 5,537,534 A | 7/1996 | Voigt et al. | |
| 5,603,001 A * | 2/1997 | Sukegawa et al. | 711/103 |
| 5,611,057 A | 3/1997 | Pecone et al. | |
| 5,613,071 A * | 3/1997 | Rankin et al. | 1/1 |
| 5,680,579 A | 10/1997 | Young et al. | |
| 5,692,149 A | 11/1997 | Lee | |
| 5,701,480 A | 12/1997 | Raz | |
| 5,742,787 A * | 4/1998 | Talreja | 711/103 |
| 5,887,138 A | 3/1999 | Hagersten et al. | |
| 5,897,661 A | 4/1999 | Baranovsky et al. | |
| 5,897,664 A | 4/1999 | Nesheim et al. | |
| 5,963,983 A | 10/1999 | Sakakura et al. | |
| 6,000,006 A | 12/1999 | Bruce et al. | |
| 6,052,815 A | 4/2000 | Zook | |
| 6,130,759 A | 10/2000 | Blair | |
| 6,141,692 A | 10/2000 | Loewenstein et al. | |
| 6,216,126 B1 | 4/2001 | Ronstrom | |
| 6,298,390 B1 | 10/2001 | Matena et al. | |
| 6,308,169 B1 | 10/2001 | Ronstrom et al. | |
| 6,434,144 B1 | 8/2002 | Romanov | |
| 6,467,060 B1 | 10/2002 | Malakapalli et al. | |
| 6,615,313 B2 | 9/2003 | Kato et al. | |
| 6,658,526 B2 | 12/2003 | Nguyen et al. | |
| 6,728,826 B2 | 4/2004 | Kaki et al. | |
| 6,745,209 B2 | 6/2004 | Holenstein et al. | |
| 6,874,044 B1 | 3/2005 | Chou et al. | |
| 6,938,084 B2 | 8/2005 | Gamache et al. | |
| 6,981,070 B1 | 12/2005 | Luk et al. | |
| 7,003,586 B1 | 2/2006 | Bailey et al. | |
| 7,010,521 B2 | 3/2006 | Hinshaw et al. | |
| 7,043,621 B2 | 5/2006 | Merchant et al. | |
| 7,082,481 B2 | 7/2006 | Lambrache et al. | |
| 7,162,467 B2 | 1/2007 | Eshleman et al. | |
| 7,200,718 B2 | 4/2007 | Duzett | |
| 7,203,890 B1 | 4/2007 | Normoyle | |
| 7,249,280 B2 | 7/2007 | Lamport et al. | |
| 7,269,708 B2 | 9/2007 | Ware | |
| 7,269,755 B2 | 9/2007 | Moshayedi et al. | |
| 7,272,605 B1 | 9/2007 | Hinshaw et al. | |
| 7,272,654 B1 | 9/2007 | Brendel | |
| 7,281,160 B2 | 10/2007 | Stewart | |
| 7,305,386 B2 | 12/2007 | Hinshaw et al. | |
| 7,334,154 B2 | 2/2008 | Lorch et al. | |
| 7,359,927 B1 | 4/2008 | Cardente | |
| 7,383,290 B2 | 6/2008 | Mehra et al. | |
| 7,406,487 B1 | 7/2008 | Gupta et al. | |
| 7,417,992 B2 | 8/2008 | Krishnan | |
| 7,467,265 B1 | 12/2008 | Tawri et al. | |
| 7,529,882 B2 | 5/2009 | Wong | |
| 7,542,968 B2 | 6/2009 | Yokomizo et al. | |
| 7,562,162 B2 | 7/2009 | Kreiner et al. | |
| 7,584,222 B1 | 9/2009 | Georgiev | |
| 7,610,445 B1 | 10/2009 | Manus et al. | |
| 7,647,449 B1 | 1/2010 | Roy et al. | |
| 7,809,691 B1 | 10/2010 | Karmarkar et al. | |
| 7,822,711 B1 | 10/2010 | Ranade | |
| 7,885,923 B1 | 2/2011 | Tawri et al. | |
| 7,917,472 B2 | 3/2011 | Persson | |
| 8,015,352 B2 | 9/2011 | Zhang et al. | |
| 8,018,729 B2 | 9/2011 | Skinner | |
| 8,024,515 B2 | 9/2011 | Auerbach et al. | |
| 8,069,328 B2 | 11/2011 | Pyeon | |
| 8,239,617 B1 | 8/2012 | Linnell | |
| 8,261,289 B2 | 9/2012 | Kasravi et al. | |
| 8,321,450 B2 | 11/2012 | Thatte et al. | |
| 8,335,776 B2 | 12/2012 | Gokhale | |
| 8,370,853 B2 | 2/2013 | Giampaolo et al. | |
| 8,401,994 B2 | 3/2013 | Hoang et al. | |
| 2002/0166031 A1 | 11/2002 | Chen et al. | |
| 2002/0184239 A1 | 12/2002 | Mosher, Jr. et al. | |
| 2003/0016596 A1 * | 1/2003 | Chiquoine et al. | 369/34.01 |
| 2003/0220985 A1 | 11/2003 | Kawamoto et al. | |
| 2004/0010502 A1 | 1/2004 | Bomfim et al. | |
| 2004/0078379 A1 | 4/2004 | Hinshaw et al. | |
| 2004/0143562 A1 | 7/2004 | Chen et al. | |
| 2004/0148283 A1 * | 7/2004 | Harris et al. | 707/5 |
| 2004/0172494 A1 * | 9/2004 | Pettey et al. | 710/305 |
| 2004/0205151 A1 | 10/2004 | Sprigg et al. | |
| 2004/0267835 A1 | 12/2004 | Zwilling et al. | |
| 2005/0005074 A1 | 1/2005 | Landin et al. | |
| 2005/0021565 A1 | 1/2005 | Kapoor et al. | |
| 2005/0027701 A1 | 2/2005 | Zane et al. | |
| 2005/0028134 A1 | 2/2005 | Zane et al. | |
| 2005/0034048 A1 | 2/2005 | Nemawarkar et al. | |
| 2005/0081091 A1 | 4/2005 | Bartfai et al. | |
| 2005/0086413 A1 | 4/2005 | Lee et al. | |
| 2005/0120133 A1 * | 6/2005 | Slack-Smith | 709/234 |
| 2005/0131964 A1 | 6/2005 | Saxena | |
| 2005/0240635 A1 | 10/2005 | Kapoor et al. | |
| 2005/0246487 A1 | 11/2005 | Ergan et al. | |
| 2006/0059428 A1 | 3/2006 | Humphries et al. | |
| 2006/0161530 A1 | 7/2006 | Biswal et al. | |
| 2006/0174063 A1 | 8/2006 | Soules et al. | |
| 2006/0174069 A1 * | 8/2006 | Shaw et al. | 711/146 |
| 2006/0179083 A1 | 8/2006 | Kulkarni et al. | |
| 2006/0195648 A1 | 8/2006 | Chandrasekaran et al. | |
| 2006/0212795 A1 | 9/2006 | Cottrille et al. | |
| 2006/0218210 A1 | 9/2006 | Sarma et al. | |
| 2006/0242163 A1 | 10/2006 | Miller et al. | |
| 2007/0043790 A1 | 2/2007 | Kryger | |
| 2007/0143368 A1 | 6/2007 | Lundsgaard et al. | |
| 2007/0174541 A1 | 7/2007 | Chandrasekaran et al. | |
| 2007/0234182 A1 | 10/2007 | Wickeraad et al. | |
| 2007/0276784 A1 | 11/2007 | Piedmonte | |
| 2007/0283079 A1 | 12/2007 | Iwamura et al. | |
| 2007/0288692 A1 | 12/2007 | Bruce et al. | |
| 2007/0294564 A1 | 12/2007 | Reddin et al. | |
| 2007/0299816 A1 | 12/2007 | Arora et al. | |
| 2008/0034076 A1 | 2/2008 | Ishikawa et al. | |
| 2008/0034174 A1 | 2/2008 | Traister et al. | |
| 2008/0034249 A1 | 2/2008 | Husain et al. | |
| 2008/0046538 A1 | 2/2008 | Susarla et al. | |
| 2008/0046638 A1 | 2/2008 | Maheshwari et al. | |
| 2008/0288713 A1 | 11/2008 | Lee et al. | |
| 2009/0006500 A1 | 1/2009 | Shiozawa et al. | |
| 2009/0006681 A1 | 1/2009 | Hubert et al. | |
| 2009/0019456 A1 | 1/2009 | Saxena et al. | |
| 2009/0024871 A1 | 1/2009 | Emaru et al. | |
| 2009/0030943 A1 | 1/2009 | Kall | |
| 2009/0070530 A1 | 3/2009 | Satoyama et al. | |
| 2009/0150599 A1 | 6/2009 | Bennett | |
| 2009/0177666 A1 | 7/2009 | Kaneda | |
| 2010/0125695 A1 | 5/2010 | Wu et al. | |
| 2010/0241895 A1 | 9/2010 | Li et al. | |
| 2010/0262762 A1 | 10/2010 | Borchers et al. | |
| 2010/0318821 A1 | 12/2010 | Kwan et al. | |
| 2011/0022566 A1 | 1/2011 | Beaverson et al. | |
| 2011/0082985 A1 | 4/2011 | Haines et al. | |
| 2011/0167038 A1 | 7/2011 | Wang et al. | |
| 2011/0179279 A1 | 7/2011 | Greevenbosch et al. | |
| 2011/0185147 A1 | 7/2011 | Hatfield et al. | |

OTHER PUBLICATIONS

Chacon, Git, The Fast Version Control System, Oct. 3, 2011, 3 pgs.
RICE, Extension Versioning, Update and Compatibility, Aug. 9, 2011, 11 pgs.
RICE, Toolkit Version Format, Aug. 19, 2011, 4 pgs.
Email Communication from James Bodwin to Christopher Brokaw re prior art, Sep. 13, 2011, 4 pgs.
Git (Software), http://en.wikipedia.org, Oct. 3, 2011, 10 pgs.
Vijaykumar, Speculative Versioning Cache, Dec. 1, 2001, 13 pgs.
Hitz, File System Design for an NFS File Server Appliance, Jan. 19, 1994, 23 pgs.
McDonald, Architectural Semantics for Practical Transactional Memory, Jun. 2006, 12 pgs.
McGonigle, A Short History of btrfs, Aug. 14, 2009, 11 pgs.
Mellor, ZFS—the future of file systems? Aug. 14, 2006, 5 pgs.
Mercurial, http://en.wikipedia.org, Oct. 2, 2011, 6 pages.

(56) References Cited

OTHER PUBLICATIONS

Module: Mongoid: Versioning, http://rdoc.info, Documentation by YARD 0.7.2, 6 pages Oct. 3, 2011.
Noach, Database Schema under Version Control, code.openarck.org, Apr. 22, 2010, 6 pages.
Reiser FS, , http://enwikipedia.org, Sep. 17, 2011, 5 pgs.
Russell, Track and Record Database Schema Versions, Jun. 28, 2005, 8 pgs.
Schooner Information Technology, IPAF, PCT/US2008/065167, Oct. 23, 2008, 7 pgs.
Schooner Information Technology, ISR/WO, PCT/US2008/065167, Jan. 28, 2009, 16 pgs.
SQL Server Database Schema Versioning and Update, Dec. 2, 2009, 2 pgs.
Sufficiently Advanced Bug, File Versioning, Caching and Hashing, Oct. 3, 2011, 3 pgs.
Buchholz, The Structure of the Reiser File System, Jan. 26, 2006, 21 pgs.
The Z File System (ZFS), FreeBSD Handbook, Oct. 3, 2011, 8 pgs (Author not provided).
Tux3 Linux Filesystem Project, 2008, 1 pg.
Tux3 Versioning Filesystem, Jul. 2008, 67 pgs.
Tux3, http://en.wikipedia.org, Jun. 2, 2010, 3 pgs.
WAFL—Write Anywhere File Layout, 1999, 1 pg.
Write Anywhere File Layout, Sep. 9, 2011, 2 pgs.
ZFS, , http://en.wikipedia.org Sep. 30, 2011, 18 pgs.
Ajmani, Automatic Software Upgrades for Distributed Systems, MIT, Sep. 2004, 164 pgs.
Amza, Data Replication Strategies for Fault Tolerance and Availability on Commodity Clusters, 2000, 9 pgs.

\* cited by examiner

HIT IN OBJ CACHE

GET MISS WITH REMOTE MODIFIED

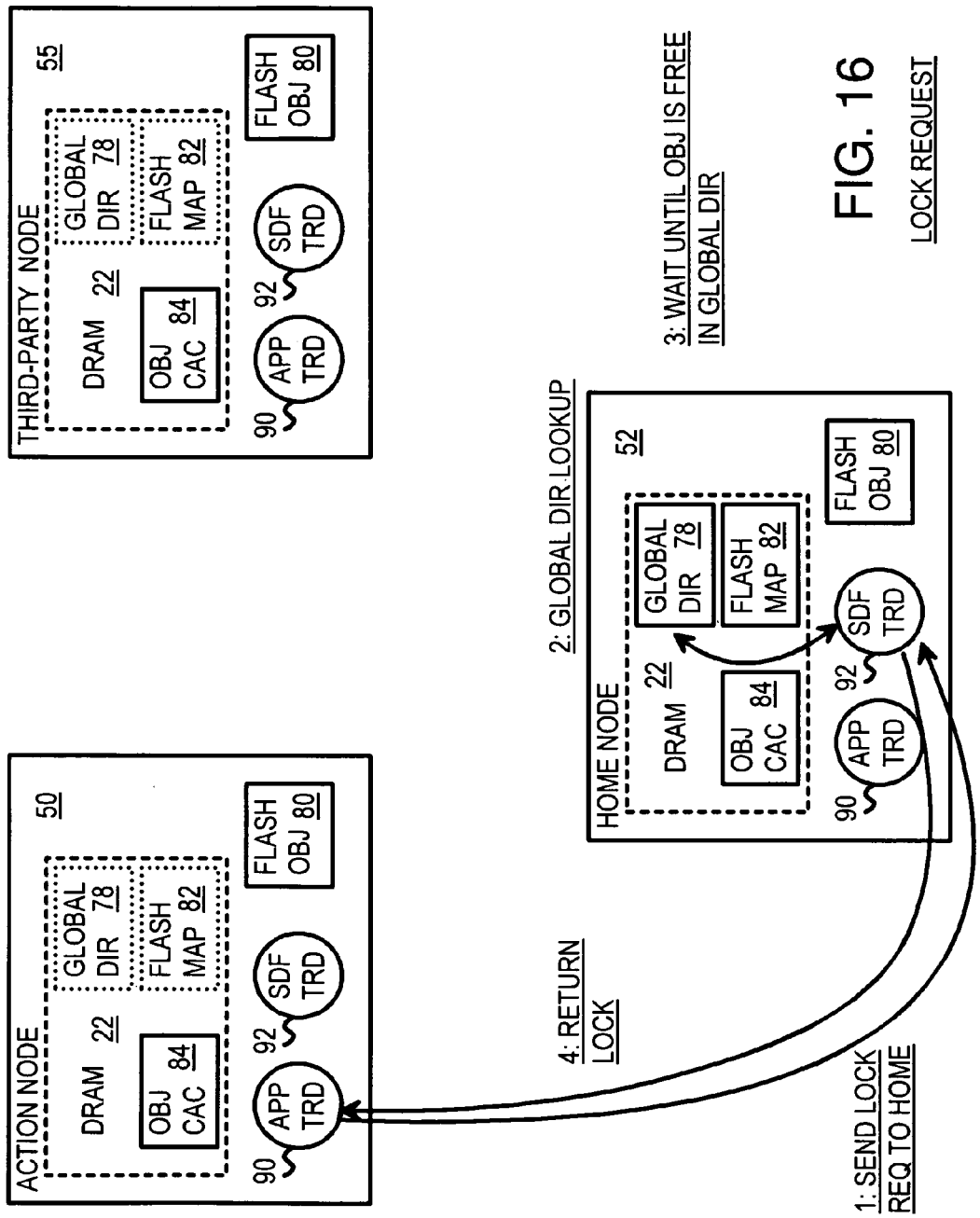

ded hardware platform is needed to ensure coherency of replicated data accessible by multiple servers.

SHARING DATA FABRIC FOR COHERENT-DISTRIBUTED CACHING OF MULTI-NODE SHARED-DISTRIBUTED FLASH MEMORY

RELATED APPLICATIONS

This application claims the benefit of U.S. Provisional Application No. 61/038,336 filed Mar. 20, 2008. This application is a Continuation-In-Part (CIP) of the co-pending U.S. application for "System Including a Fine-Grained Memory and a Less-Fine-Grained Memory", U.S. Ser. No. 12/130,661, filed May 30, 2008, and the co-pending PCT application for "System Including a Less-Fine-Grained Memory and a Fine-Grained Memory with a Write Buffer for the Less-Fine-Grained Memory", U.S. Ser. No. PCT/US08/65167, filed May 29, 2008, hereby incorporated by reference.

FIELD OF THE INVENTION

This invention relates to shared multi-node storage systems, and more particularly to coherent caching of objects in a shared, global flash memory.

BACKGROUND OF THE INVENTION

Demand for computer disk storage has increased sharply in the last decade. Computer hard-disk technology and the resulting storage densities have grown rapidly. Despite application-program bloat, a substantial increase in web sites and their storage requirements, and wide use of large multimedia files, disk-drive storage densities have been able to keep up. Disk performance, however, has not been able to keep up. Access time and rotational speed of disks, key performance parameters in many applications, have only improved incrementally in the last 10 years.

Web sites on the Internet may store vast amounts of data, and large web server farms may host many web sites. Storage Area Networks (SANs) are widely used as a centralized data store. Another widespread storage technology is Network Attached Storage (NAS). These disk-based technologies are now widely deployed but consume substantial amounts of power and can become a central-resource bottleneck. The recent rise in energy costs makes further expansion of these disk-based server farms undesirable. Newer, lower-power technologies are desirable.

FIG. 1 highlights a prior-art bottleneck problem with a distributed web-based database server. A large number of users access data in database 16 through servers 12 on web 10. Web 10 can be the Internet, a local Intranet, or other network. As the number of users accessing database 16 increases, additional servers 12 may be added to handle the increased workload. However, database 16 is accessible only through database server 14. The many requests to read or write data in database 16 must funnel through database server 14, creating a bottleneck that can limit performance.

FIG. 2 highlights a coherency problem when a database is replicated to reduce bottlenecks. Replicating database 16 by creating a second database 16' that is accessible through second database server 14' can reduce the bottleneck problem by servicing read queries. However, a new coherency problem is created with any updates to the database. One user may write a data record on database 16, while a second user reads a copy of that same record on second database 16'. Does the second user read the old record or the new record? How does the copy of the record on second database 16' get updated? Complex distributed database software or a sophisticated scalable clus- Adding second database 16' increases the power consumption, since a second set of disks must be rotated and cooled. Operating the motors to physically spin the hard disks and run fans and air conditioners to cool them requires a substantially large amount of power.

It has been estimated (by J. Koomey of Stanford University) that aggregate electricity use for servers doubled from 2000 to 2005 both in the U.S. and worldwide. Total power for servers and the required auxiliary infrastructure represented about 1.2% of total US electricity consumption in 2005. As the Internet and its data storage requirements seem to increase exponentially, these power costs will ominously increase.

Flash memory has replaced floppy disks for personal data transport. Many small key-chain flash devices are available that can each store a few GB of data. Flash storage may also be used for data backup and some other specialized applications. Flash memory uses much less power than rotating hard disks, but the different interfacing requirements of flash have limited its use in large server farms. The slow write time of flash memory complicates the coherency problem of distributed databases.

What is desired is a large storage system that uses flash memory rather than hard disks to reduce power consumption. A flash memory system with many nodes that acts as a global yet shared address space is desirable. A global, shared flash memory spread across many nodes that can coherently share objects is desirable.

BRIEF DESCRIPTION OF THE DRAWINGS

FIG. 16 shows a lock operation.

DETAILED DESCRIPTION

The present invention relates to an improvement in global, shared flash memory systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that power consumption can be dramatically reduced by replacing rotating hard disks with flash memory. The flash memory can be distributed across many physical nodes, and each node can have a processor that can process user requests and system-management threads.

Dynamic-random-access memory (DRAM) on each of the physical nodes can cache data or objects that are normally stored in flash memory. Coherency among objects in flash and in DRAM can be ensured by a Sharing Data Fabric (SDF) middleware layer. SDF includes an interface for communications between high-level programs and lower-level hardware controllers and their software and firmware drivers. SDF is accessible by high-level application programs using an applications-programming interface (API). Communication between nodes to ensure coherency is performed by SDF threads.

The DRAM cache may hold copies of objects stored in the local node's flash memory, or copies of flash objects stored in another node's flash memory. Global caching is achieved by the SDF, which enables the local DRAM cache to store copies of objects from other nodes. Objects can reside anywhere in a shared, global address space. The SDF copies objects to DRAM caches on any node while ensuring consistency.

Figure 1:
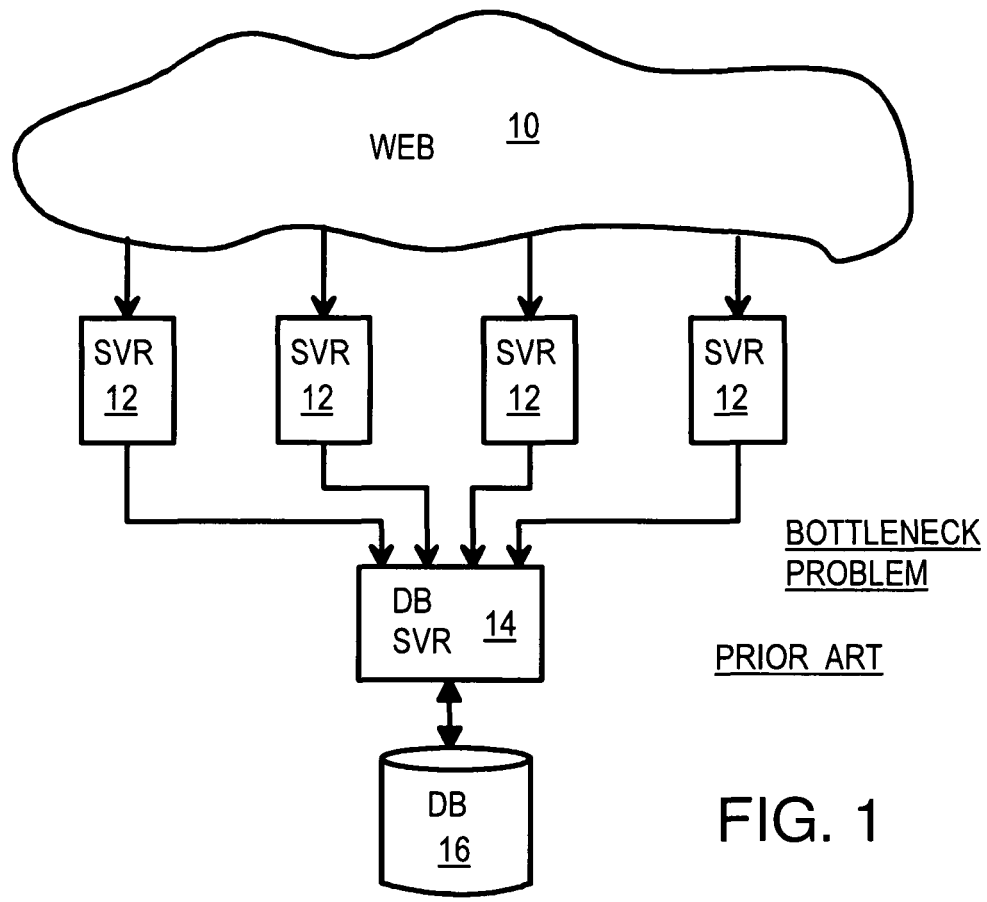
FIG. 1 highlights a prior-art bottleneck problem with a web-based database server.
Figure 2:
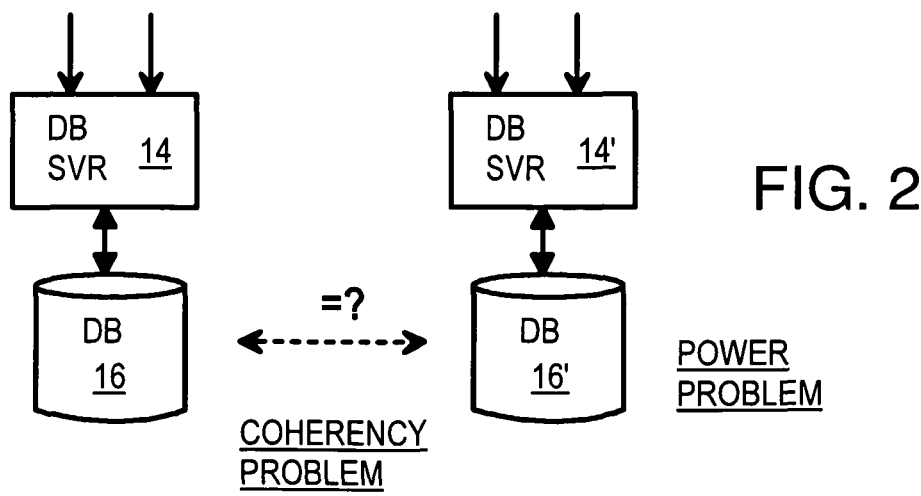
FIG. 2 highlights a coherency problem when a database is replicated to reduce bottlenecks.

This distributed caching of flash is extremely useful since a process such as a web server running on one node's processor may access data stored on any of the nodes. The system can be scaled up by adding nodes. Normally, adding nodes slows a system down, since bottlenecks may occur to data stored in just one location on a remote node, such as shown on FIG. 1. However, using SDF, data or objects may be cached on one or more nodes, allowing multiple processors to access the same data. Coherency of the cached objects is important to prevent data corruption.

Figure 3:
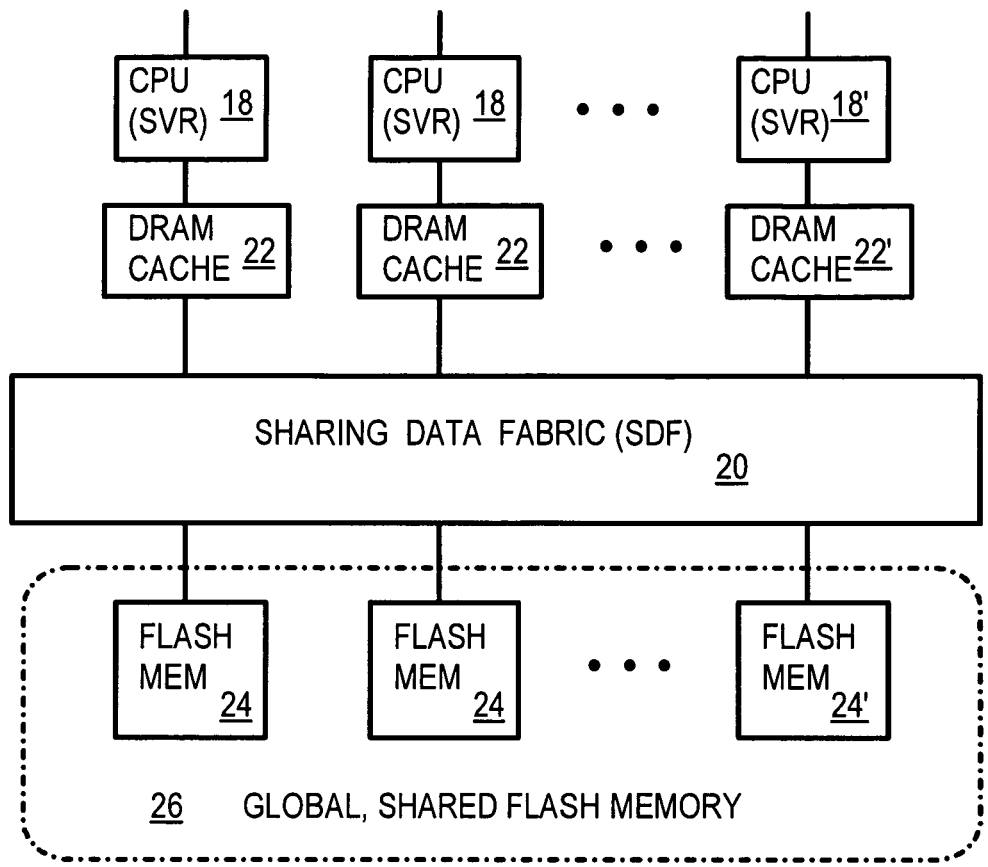
FIG. 3 shows a global, shared flash memory that appears to be a single global address space to multiple servers connected to a Sharing Data Fabric (SDF).

FIG. 3 shows a global, shared flash memory that appears to be a single global address space to multiple servers connected to a sharing data fabric (SDF). Central Processing Units (CPUs) or processors 18, 18' can execute programs such as server applications to process requests that arrive over a network such as the Internet. Each of processors 18 has a cache of DRAM 22 that contain local copies of objects. These local copies in DRAM 22 are accessed by processors 18 in response to requests from external users.

While DRAM 22, 22' stores transient copies of objects, the objects are more permanently stored in flash memory 24, 24'. Objects remain in flash memory 24, 24' and are copied to caches in DRAM 22, 22' in response to access requests by programs running on processors 18, 18'.

Sharing data fabric (SDF) 20 is a middleware layer that includes SDF threads running on processors 18, 18', and APIs and tables of data. A physical interconnect such as an Ethernet or InfiniBand® fabric connect physical nodes together. Object copies are transferred across the physical interconnect by SDF 20 from flash memory 24, 24' to cache DRAM 22, 22', and among DRAM 22, 22' caches as needed to ensure coherency of object copies.

Flash memory 24, 24' can be physically located on many nodes, such as having one flash memory 24 for each processor 18, or in other arrangements. SDF 20 makes all the objects stored in flash memory 24, 24' appear to be stored in a global address space, even though the global address spaced is shared among many processors 18, 18'. Thus flash memory 24, 24' together appear to be one global, shared flash memory 26 via SDF 20.

Figure 4:
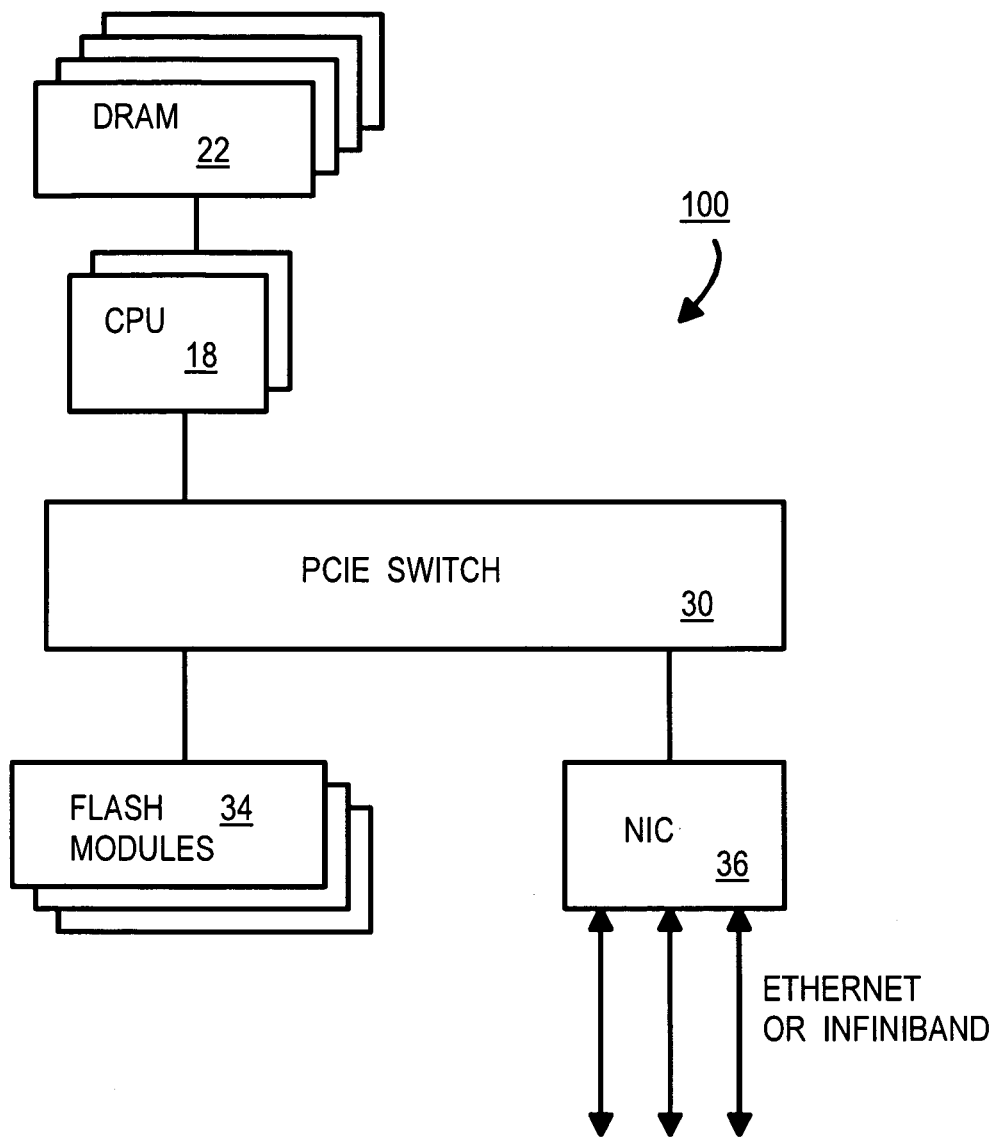
FIG. 4 shows a hardware node in a global, shared flash memory system.

FIG. 4 shows a hardware node in a global, shared flash memory system. A flash memory system has multiple nodes such as shown in FIG. 4. The multiple nodes are connected together by a high-speed interconnect such as an Ethernet or InfiniBand. One or more links in this high-speed interconnect connect to Network Interface Controller (NIC) 36 on the node shown in FIG. 4.

Processor 18 executes application programs, threads, and other routines and accesses a local memory that stores program code and data, such as DRAM 22. DRAM 22 also acts as a DRAM cache of objects in the global, shared flash memory.

Processor 18 also connects to switch 30. Switch 30 may be a PCI EXPRESS switch. Switch 30 allows processor 18 to communicate with other nodes through NIC 36 to send and receive object copies and coherency commands. Flash modules 34 contain arrays of flash memory that store permanent objects. Flash modules 34 are accessed by processor 18 through switch 30.

Figure 5:
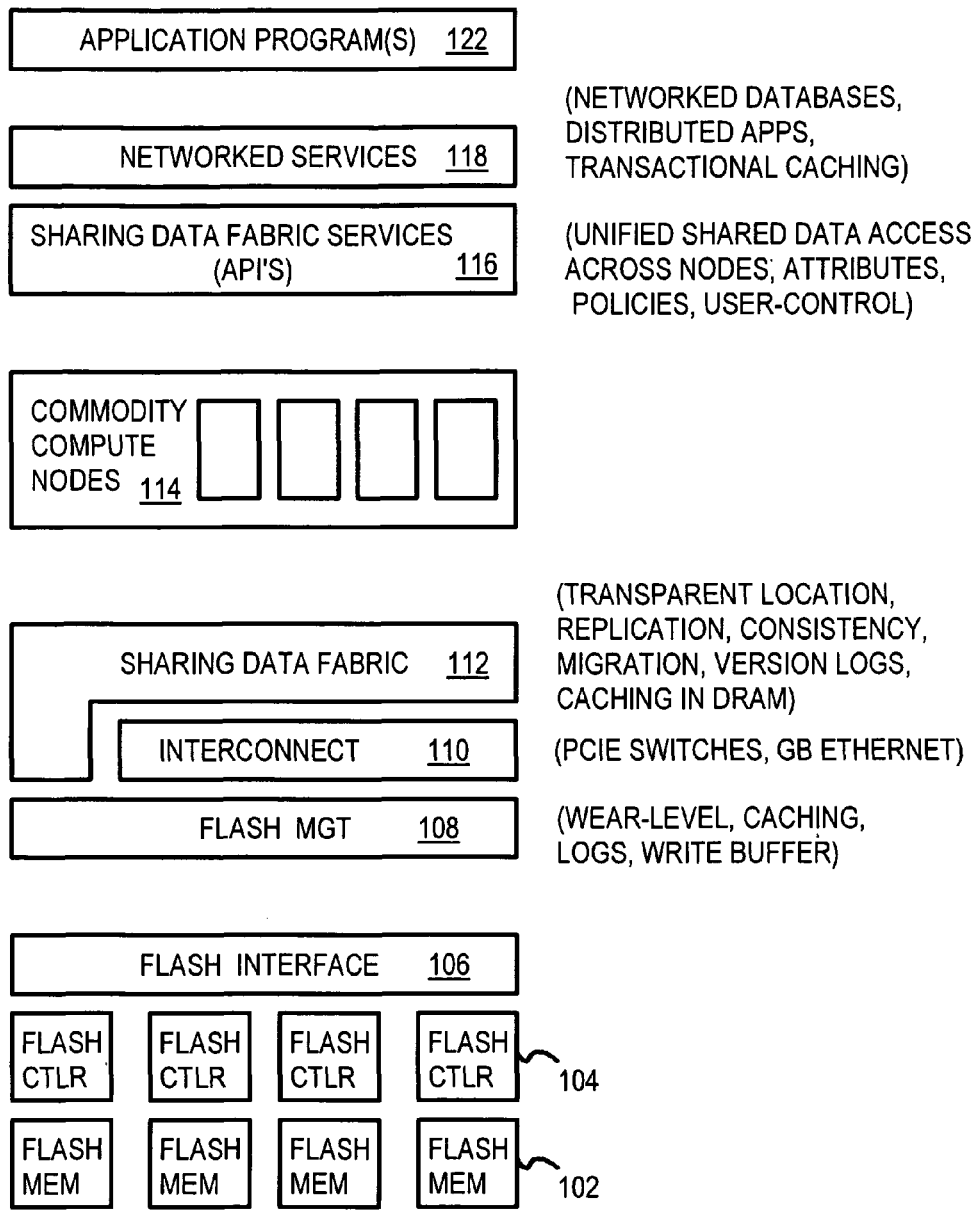
FIG. 5 is a layer diagram of software and hardware layers in a flash memory system using a shared data fabric to enable global sharing of a distributed flash memory.

FIG. 5 is a layer diagram of software and hardware layers in a flash memory system using a shared data fabric to enable global sharing of a distributed flash memory. Sharing data fabric services 116 include API's that application programs 122 or networked services 118 can use to access objects and control attributes of the objects. Sharing data fabric services 116 are the API's that communicate with routines and threads in sharing data fabric 112 that provide a unified shared data access of objects that are permanently stores in flash memory 102, and may maintain cached copies in DRAM in compute nodes 114.

Compute nodes 114 are compute nodes, such as node 100 shown in FIG. 4, with processors, DRAM caches of objects, and interconnect. These compute nodes may be constructed from commodity parts, such as commodity processors, interconnect switches and controllers, and DRAM memory modules.

Sharing data fabric services 116 allow application programs 122 and networked services 118 to control policies and attributes of objects by executing routines and launching threads of sharing data fabric 112 that are executed on compute nodes 114. The exact location of objects within flash memory 102 is transparent to application programs 122 and networked services 118 since sharing data fabric 112 copies objects from flash memory 102 to DRAM caches in compute nodes 114 and may obtain a copy from any location in flash memory 102 that has a valid copy of the object. Objects may be replicated to make back-up copies in flash memory 102.

Sharing data fabric 112 performs consistency and coherency operations such as flushing modified objects in a DRAM cache to copy back and update the permanent object in flash memory 102. Sharing data fabric 112 may also migrate flash objects to new flash pages for wear-leveling or other purposes, and update version logs and transaction logs.

Interconnect 110 includes the switches 30 in each of compute nodes 114, and the high-speed interconnect between nodes, such as Ethernet or InfiniBand links. Sharing data fabric 112 sends objects and coherency commands across interconnect 110 or directly within the local compute node. Flash management 108 is activated to migrate flash blocks for wear-leveling and replication. Wear-leveling schemes assign flash blocks for writing in a rotating, least-written, or other fashion to even out usage of flash blocks and prevent early wear-out and failure. Write buffers of flash blocks, logs, and caches may be kept by flash management 108.

Flash interface 106 is an interface between flash management 108 and hardware flash controllers 104, which control low-level access of flash memory 102. While flash memory 102 may have separate modules on different nodes of compute nodes 114, sharing data fabric 112 uses interconnect 110, flash management 108, and flash interface 106 to transparently move objects to and from flash memory 102 on different nodes. Flash memory 102 in aggregate appears to be a single, unified flash memory that is transparently shared among many application programs 122 running on many compute nodes 114.

Figure 6:
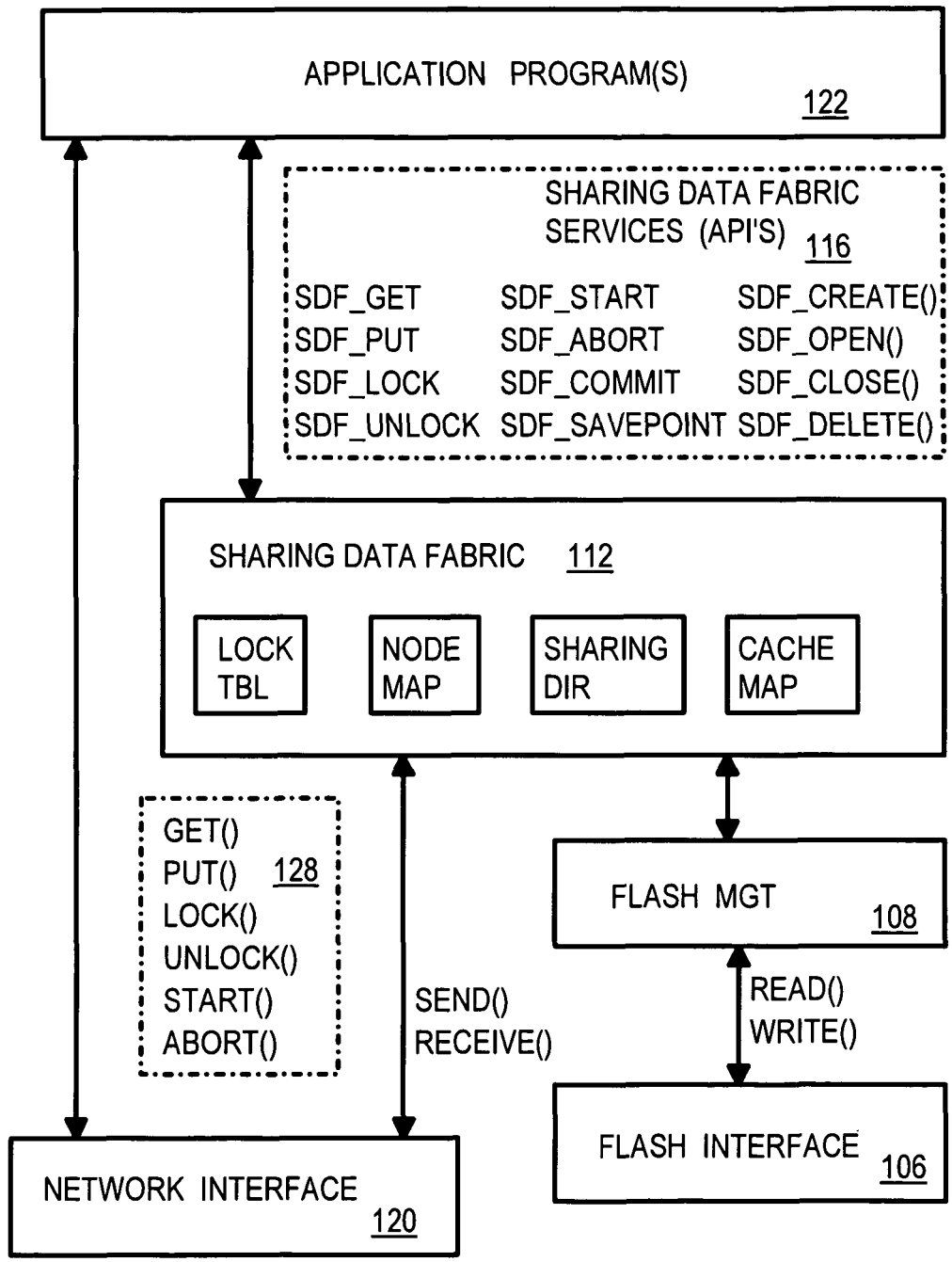
FIG. 6 is a transaction diagram of services and interfaces to a shared data fabric.

FIG. 6 is a transaction diagram of services and interfaces to a shared data fabric. Application programs 122 could communicate directly with network interface 120, but then the location of objects in flash memory is not transparent to application programs 122. Application programs 122 would then need detailed location information on objects. Send and receive commands to network interface 120 may include commands 128 such as get, put, lock, unlock, start, and abort, which need detailed information on the object's location, such as a file handle or address Detailed information may include context, container ID, object ID. Location information may be calculated by using a combination of the container ID and the object ID. Application programs 122 would have to be re-written to provide this detailed location information, which is undesirable.

Instead, standard, substantially unmodified application programs 122 are used, but instead of accessing network interface 120 directly, application programs 122 accesses sharing data fabric 112 using API's 116. API's 116 include SDF_GET, SDF_PUT, SDF_LOCK, and other SDF-specific versions of start, abort, commit, savepoint, create, delete, open, and close commands. For example, lock and unlock commands lock and unlock an object using a lock table in sharing data fabric 112 to prevent another user from accessing that object while locked. A node map in sharing data fabric 112 maps objects to address locations in the node's flash memory, allowing sharing data fabric 112 to read and write objects in flash memory through flash management 108 and flash interface 106. There is a node map for each node having flash memory.

Objects that reside in flash memory on a first node may be accessed over sharing data fabric 112 by sending and receiving messages, and sending object data from a second node over network interface 120. These messages may include commands 128 such as get, put, lock, unlock, start, and abort. These commands 128 are executed by SDF 112 using detailed information on the object's location, such as a file handle or address, that are obtained from the node map, sharing directory, or cache map in sharing data fabric 112. Commands 128 and messages are received by a sharing data fabric 112 on the first node, which may access its local flash memory to obtain the object. On a read access, sharing data fabric 112 on the first node can then send the object data back through network interface 120 to the second node's sharing data fabric 112.

Figure 7:
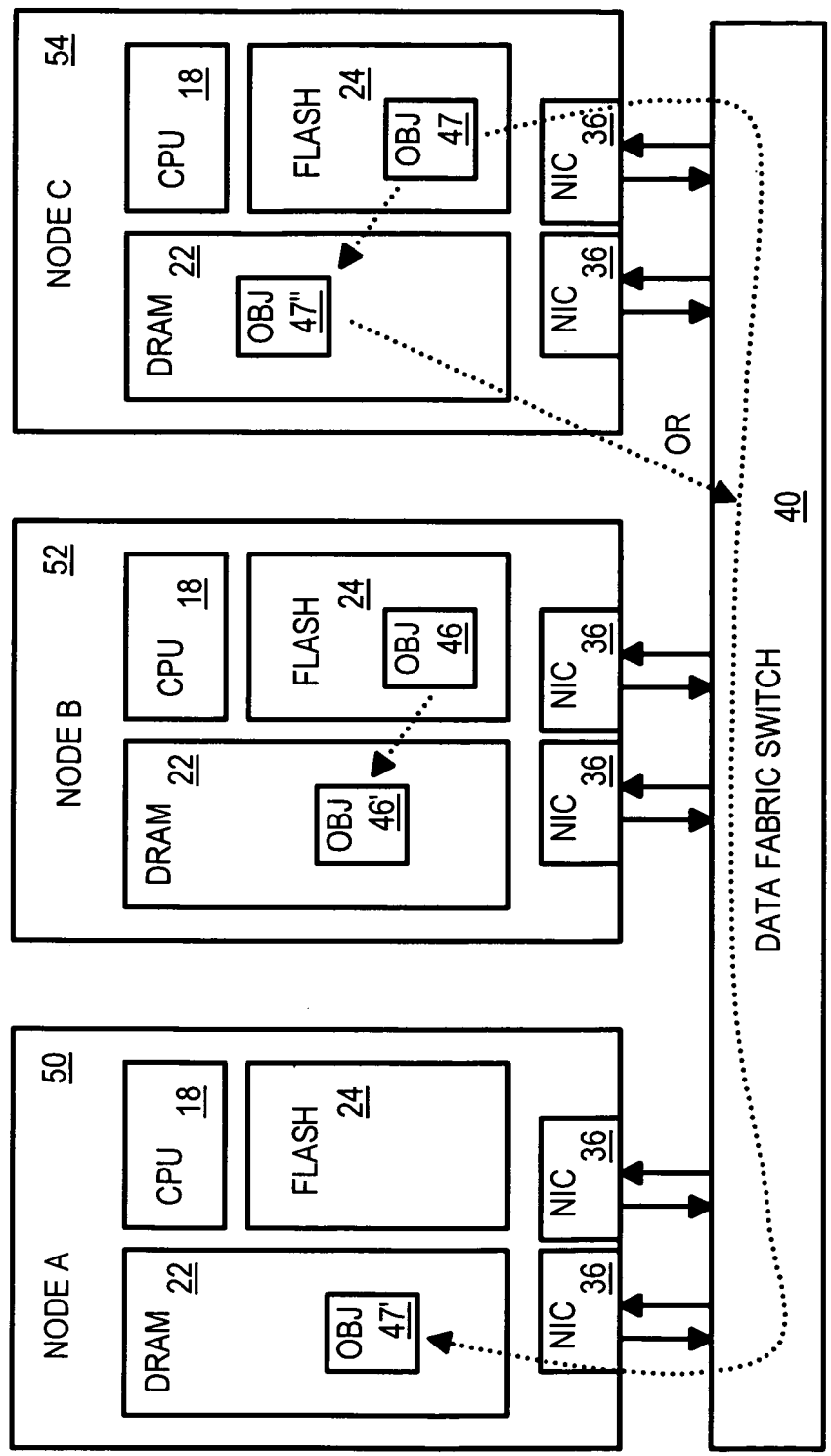
FIG. 7 shows permanent objects in flash memory being copied to DRAM caches on multiple nodes.

FIG. 7 shows permanent objects in flash memory being copied to DRAM caches on multiple nodes. Data fabric switch 40 connects to NIC 36 on three compute nodes. Each node has two NICs 36 to allow for a higher interconnect bandwidth and for redundancy. Each of nodes 50, 52, 54 has a processor 18, flash memory 24, and an object cache in DRAM 22. An Ethernet or other switch (not shown) may also be used, or may be included in data fabric switch 40.

A thread executing on processor 18 on node 52 requests access to object 46, which is present in flash memory 24 on node 52. The SDF on node 52 reads object 46 from flash memory 24 and copies the object into its object cache in DRAM 22 as object copy 46'. The application program running on node 52 can then read object copy 46' from its DRAM 22. In this example transfer over data fabric switch 40 was not needed.

In a second example, a thread executing on processor 18 on node 50 requests access to object 47, which is not present in flash memory 24 on node 50, nor in DRAM 22 on node 50. The SDF on node 50 determines that node 54 is the home node for object 47. Node 50 may perform a lookup in a directory to locate the object's home node. The directory may have several parts or levels and may reside partially on local node 50 and partially on other nodes.

An SDF thread on node 50 sends a message to the home node, node 54, requesting a copy of object 47. In response, another SDF thread on home node 54 reads object 47 from flash memory 24 and sends object 47 over data fabric switch 40 to local node 50. The SDF thread on local node 50 copies the object data into its object cache in DRAM 22 as object copy 47'. The application program running on local node 50 can then read object copy 47' from its object cache in DRAM 22.

Object 47 may have already been copied into DRAM 22 on node 54 as object copy 47". Rather than read object 47 from flash memory 24, when object copy 47" is present, object copy 47" may be read from DRAM 22 and then sent over data fabric switch 40 to node 50 to load object copy 47' into DRAM 22 on node 50.

Figure 8:
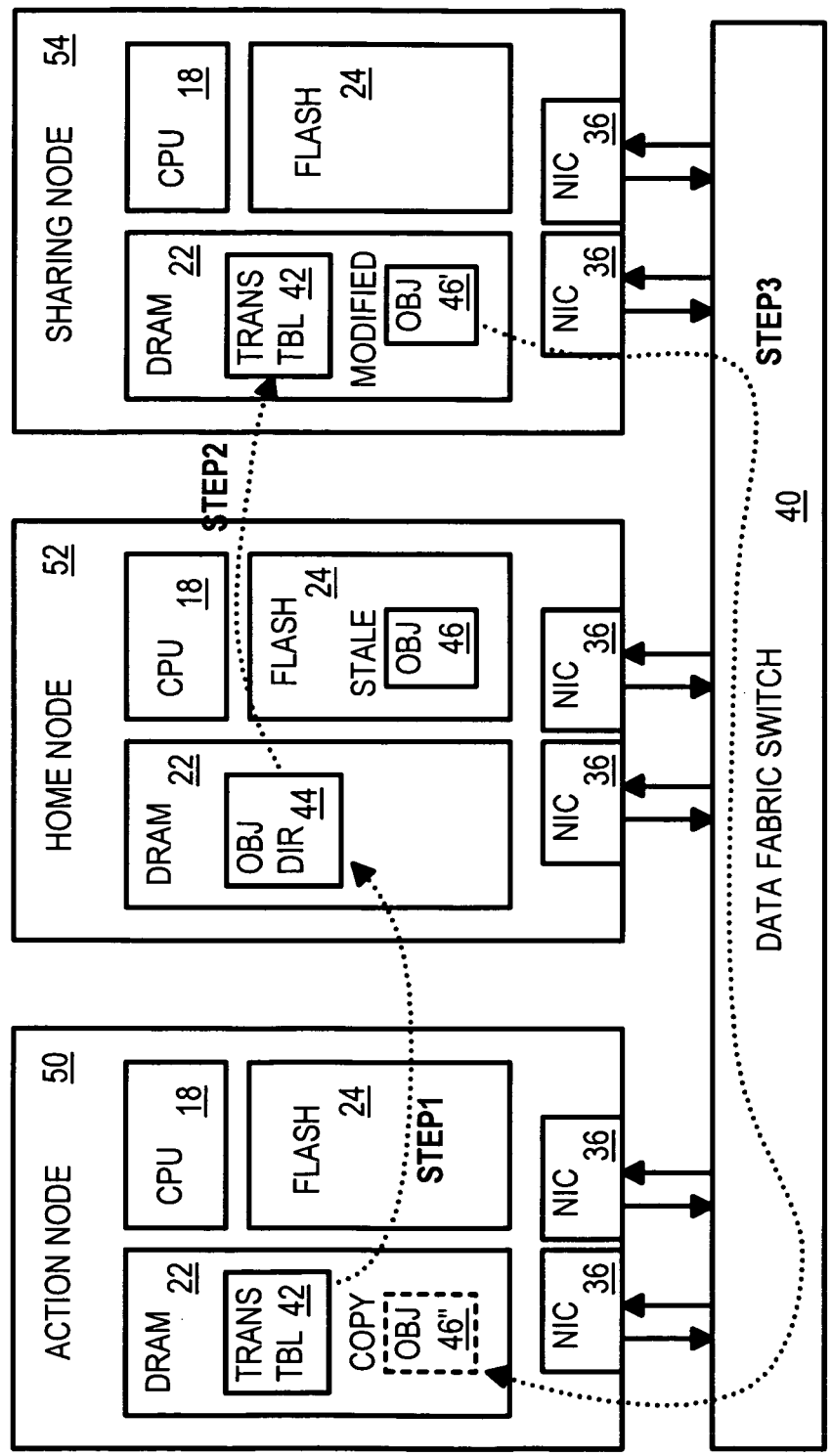
FIG. 8 shows an action node requesting an object from a home node that fetches a modified object on a sharing node using transaction tables and an object directory.

FIG. 8 shows an action node requesting an object from a home node that fetches a modified object on a sharing node using transaction tables and an object directory. A node may operate as a home node, an action node, or a sharing node for any particular object.

Home node 52 is the permanent location of object 46 in flash memory 24. Action node 50 is executing an application program that requests an object. Sharing node 54 has a copy of the object in its object cache in DRAM 22.

A program executing on action node 50 requests access of object 46. Object 46 is not yet present in DRAM 22 of action node 50, so the SDF determines the object's home node, such as by hashing the object's name or identifier or looking up the object in a table.

Transaction table 42 is stored in DRAM 22 of action node 50 and eventually contains information to identify home node 52. In response to a request from action node 50 to access object 46, the SDF on home node 52 looks up the object in its object directory 44. Object directory 44 indicates that although object 46 is present in flash memory 24 of home node 52, this object 46 is stale. A modified object 46' is present in DRAM 22 of sharing node 54 in this example.

Since modified object 46' is more current than stale object 46 in flash memory 24, SDF on home node 52 sends a message to SDF on sharing node 54. This message causes transaction table 42 on sharing node 54 to be checked to make sure that modified object 46' is not locked for use by a program executing on sharing node 54. If modified object 46' is locked, action node 50 waits until the lock is released. Release of the lock causes an update of transaction table 42 on sharing node 54.

When transaction table 42 indicates that modified object 46' is unlocked, SDF on sharing node 54 sends the object data of modified object 46' over data fabric switch 40 to action node 50. Object copy 46" is created in DRAM 22 on action node 50. The requesting program on action node 50 can now access object copy 46".

Other steps may be performed to update stale object 46 in flash memory 24 on home node 52, although this may be delayed to allow home node 50 to update object copy 46" to reduce the number of writes to flash memory 24.

Figure 9:
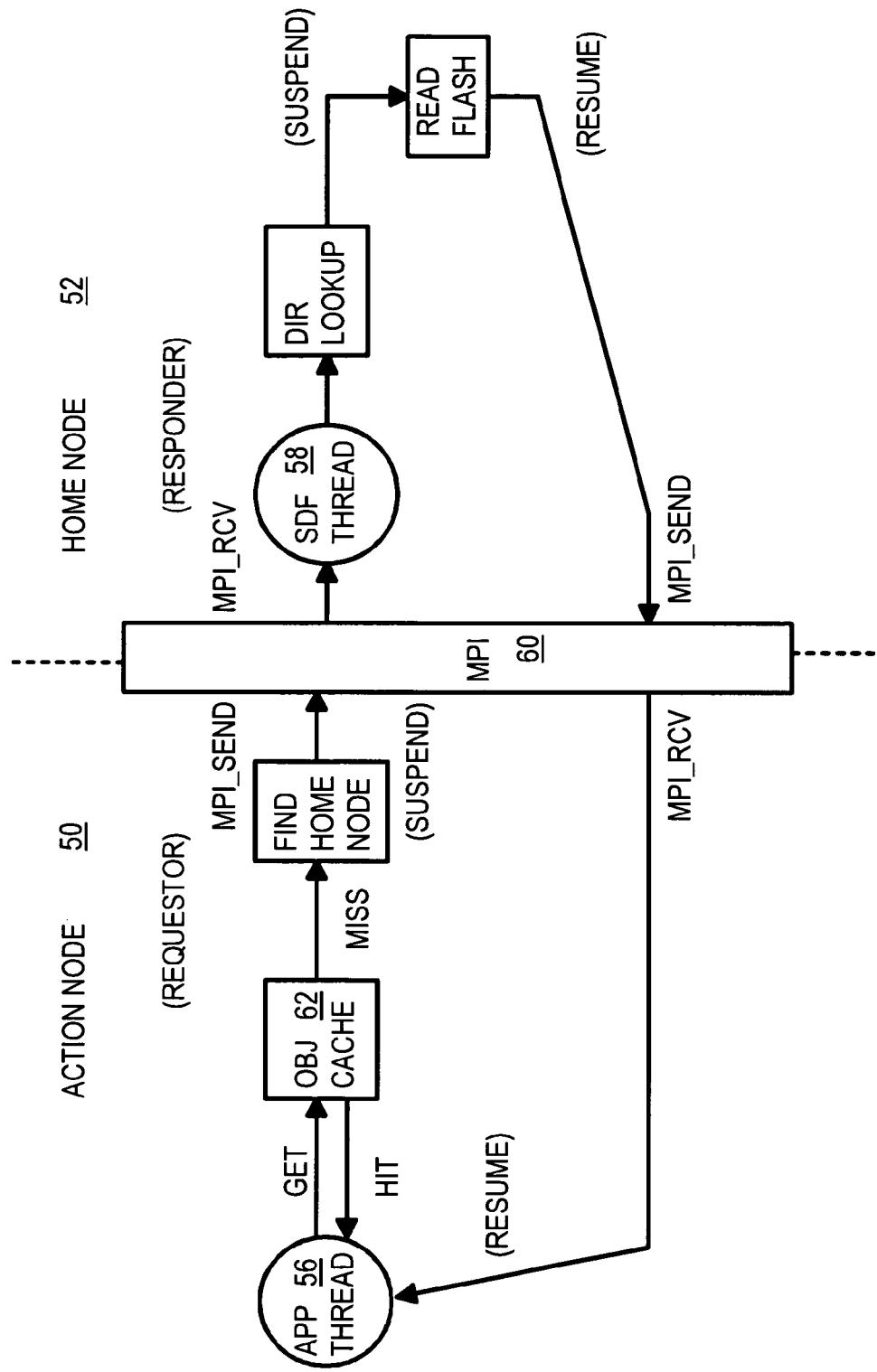
FIG. 9 is a storage flow model of an action node requesting an object from flash memory at a home node.

FIG. 9 is a storage flow model of an action node requesting an object from flash memory at a home node. Application thread 56 is being executed by the processor on action node 50. Application thread 56 requests access to an object by sending a get request, which reads the object from object cache 62 in DRAM on a hit.

A get request is a request from an application process to access an object locally, no matter where the object source is or where an object copy is cached. A put request is a request to indicate that the application has completed its access or updates to the object. The object may be sent to home node 52 to update the object in flash memory, depending on the nature of the put request, the state of the DRAM cache, the transaction, and consistency requirements.

When the object is not found in object cache 62, a miss occurs. The SDF locates the home node, such as by hashing the object identifier or looking up the object address in a table or directory. A message is sent over the interconnect to home node 52. A message-passing-interface (MPI) or similar messaging interface may be used. Application thread 56 is suspended.

The message from action node 50 is sent over MPI 60 and received by home node 52. A MPI_SEND command is generated by action node 50 to MPI 60 and a MPI_message is sent by MPI 60 to home node 52.

SDF thread 58 is activated by an MPI_RCV event signaled when the MPI_message is received by home node 52. SDF thread 58 extracts the object identifier from the message and looks up the object identifier in the global cache directory of the home node. When the in-flash-memory copy of the object is not marked stale in the directory, the object is read from flash memory of home node 52. SDF thread 58 can be suspended during the flash memory read and then resumed once the flash memory read is complete. A MPI_SEND command is generated with the address or node identifier of the requesting action node 50. The object read from flash memory is sent over MPI 60 to action node 50.

A MPI_RCV event is signaled on action node 50, and the object is loaded into the DRAM cache. Application thread 56 can then be resumed. Application thread 56 reads the object copy from DRAM object cache 62. With this synchronous storage flow model, application thread 56 may be suspended on a miss in DRAM object cache 62 while the object is fetched from home node 52. Application thread 56 then resumes execution when the object is received at action node 50. In this synchronous flow model, action node 50 acts as the requestor and home node 52 acts as the responder.

Figure 10:
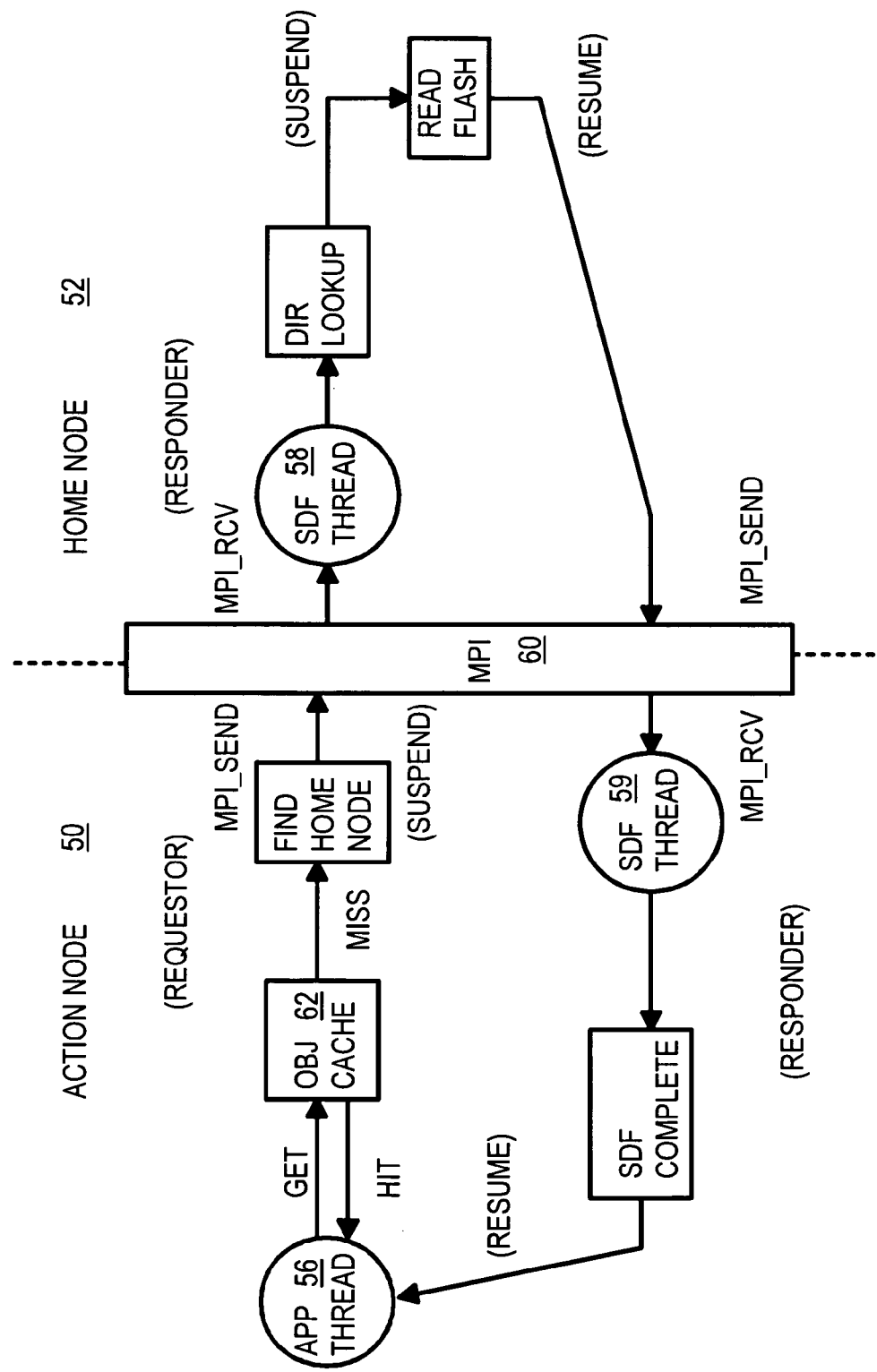
FIG. 10 is a storage flow model of an action node requesting an object from flash memory at a home node using an asynchronous SDF thread at the action node.

FIG. 10 is a storage flow model of an action node requesting an object from flash memory at a home node using an asynchronous SDF thread at the action node. Operation is similar to that described for the synchronous flow model of FIG. 9, except that SDF thread 59 is activated at action node 50 by the MPI_RCV event after home node 52 sends the object over MPI 60. SDF thread 59 copies the object into DRAM object cache 62 and completes. Application thread 56 can then be resumed. Application thread 56 reads the object copy from local DRAM object cache 62. In this asynchronous flow model, action node 50 acts as both requestor and responder and home node 52 acts as the responder.

In the asynchronous storage flow model of FIG. 10, application thread 56 is not suspended on a get or put operation. Application thread 56 can subsequently poll for completion or re-synchronize with the get or put request using a Sync operation. Application thread 56 does not have to be delayed while waiting for the remote object fetch.

Figure 11:
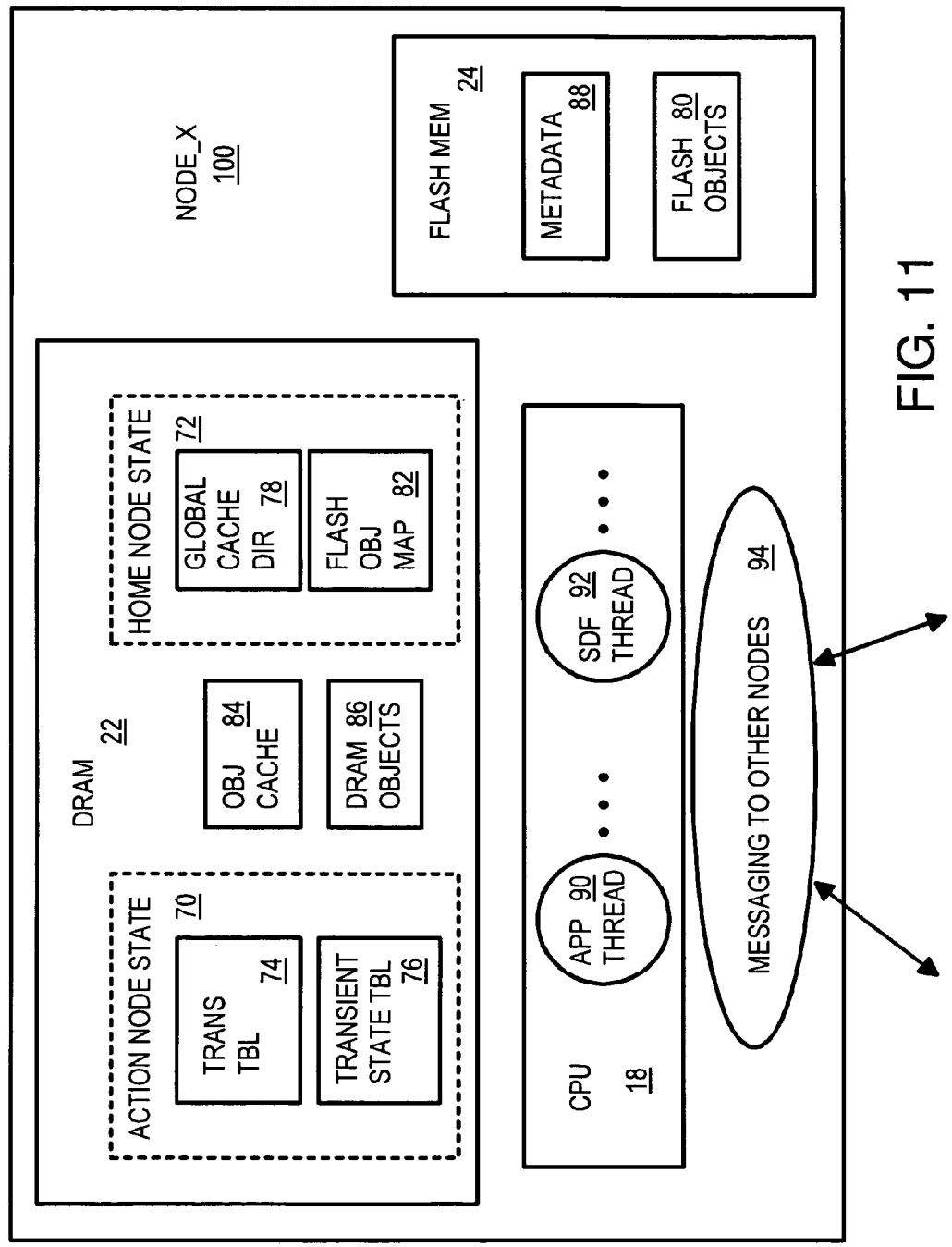
FIG. 11 is a snapshot state diagram of a compute node that can act as an action, home, or sharing node.

FIG. 11 is a snapshot state diagram of a compute node that can act as an action, home, or sharing node. Node 100 is one of compute nodes 114 of FIG. 5, with hardware such as detailed in FIG. 4.

Node 100 has threads running on processor 18, including application thread 90 and/or SDF thread 92. Messaging 94 allows SDF thread 92 to send and receive messages from other nodes, such as the messaging shown in more detail in FIGS. 12-16 between action, home, and sharing nodes. Messaging 94 may use software for MPI 60 (FIGS. 9-10) and hardware such as interconnect 110 of FIG. 5, NIC's 36 of FIGS. 4, 7, and other hardware such as switches.

Node 100 includes DRAM 22 and flash memory 24. The DRAM state shown is a snapshot of the contents of DRAM 22 at a particular point in time, while the flash state is a snapshot of the contents of flash memory 24 at approximately that same time.

Flash memory 24 at each node stores flash objects 80, which may be grouped into containers. A flash object may be uniquely addressable in the SDF using a container-identification and an object identifier. Metadata 88 stored in flash memory 24 may include container metadata and global metadata. Container metadata describes the attributes or properties of objects in a container (such as a number of replicas for the container). Global metadata may include virtual-to-physical node-identification mappings and hash functions. The hash function is performed on the object's name to generate an identifier that can be used in further table lookups to locate the object.

Object cache 84 in DRAM 22 stores copies of objects that are also stored in flash memory 24 of the home node, which may be node 100 or may be another node. DRAM objects 86 are objects that have node 100 as their home node, but the object's attributes specify that the object primarily resides in DRAM 22 rather than in flash memory 24. For example, frequently-accessed objects may be selectively enabled to remain in DRAM 22 rather than the flash memory.

DRAM 22 also stores state information for particular classes of nodes. Action node state 70 stores state information for objects using node 100 as the action node, while home node state 72 stores state information for objects using node 100 as their home node, such as DRAM objects 86 and flash objects 80.

A home node is a well known, an authoritative source of the object, which resides in DRAM, flash memory, or another component in the storage sub-system. While an object may be cached and/or replicated in DRAM and/or flash memory at several nodes, only one of these nodes (at any one time) is considered to be the home node for that object. An Action node (that is not also the home node) stores a transient copy of an object. The action node usually obtains a copy of the object from the home node. Node 100 can operate as the home node for some objects, and as the action node for other objects.

Transaction table 74 in action node state 70 stored in DRAM 22 has entries to track transactions. Transaction table 74 keeps a list of all objects accessed (touched) during a transaction, and may keep a copy of the object's initial state when the object is modified, or a pointer to a log of changes from an initial state that is archived. The initial state pointed to by transaction table 74 aids in object recovery if an abort occurs. Transaction table 74 provides recoverability for threads of applications and SDF services that execute on the node's processor.

A transaction is a series of operations. The transaction as a whole succeeds as a unit or the transaction and all operations in the transaction are aborted. This may also be referred to as an atomic set of operations. In a transactional system that maintains isolation among concurrent transactions, there are no unexpected effects from an aborted transaction since either all operations in the transaction are executed completely, or any partially-executed operations of the transaction are aborted without visible side effects.

Transient protocol state table 76 in action node state 70 stored in DRAM 22 has entries to track outstanding requests. The requesting thread, type of request, request status, and order of requests from each thread are stored in this table, which is shared by all threads at node 100.

Home node state 72 stores information for objects that have node 100 as their home node, and are thus stored (homed) in DRAM 22 (DRAM objects 86) or flash memory 24 (flash objects 80) of node 100. Home node state 72 in DRAM 22 stores a sharing list within global cache directory 78, and flash object map 82. Global cache directory 78 stores the state of all objects that have node 100 as their home node and have been cached in one or more nodes in the system. The state of the object in global cache directory 78 is one of shared, modified, invalid, and either locked or unlocked. An indication of whether the object is being accessed within a transaction may also be stored in global cache directory 78. The locations of cached copies at other nodes, and the state and progress of any coherency operations for the objects are also kept in global cache directory 78.

Flash object map 82 maintains a map between an object identifier and its location in flash memory 24. Flash object map 82 may store an address, a partial address, or an identification of the location of the object in flash memory 24. Flash object map 82 maps at least a portion of a respective identifier of a particular one of the objects to a physical location in flash memory 24. Flash object map 82 has entries for all flash objects 80 that belong to this home node, regardless of whether that object is cached at any node. Flash object map 82 may be a homed object map that also has entries for all DRAM objects 86 at this home node.

Object Flows Using SDF—FIGS. 12-16

Snapshots of the states and movements of objects and messages among three nodes in a multi-node shared flash memory system are shown in the examples of FIGS. 12-16. Snapshot diagrams, similar to that of FIG. 11, are shown for each of action node 50, home node 52, and third-party node 55 in each drawing. Sharing node 54 (FIG. 8) is an example of third-party node 55. Messages passed among these nodes, including object being copied, are shown by the arrows.

Figure 12:
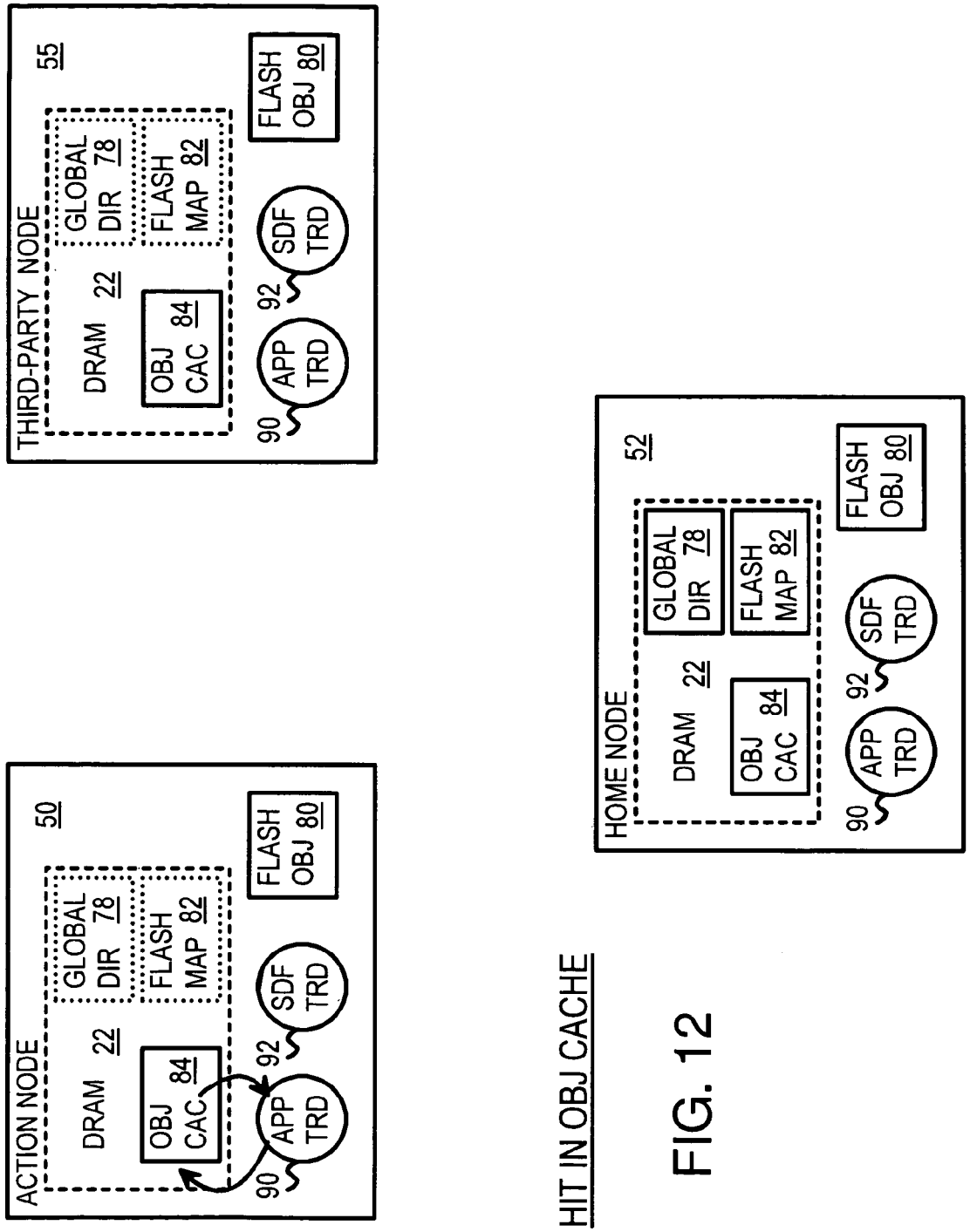
FIG. 12 shows a hit in the object cache of the action node.

FIG. 12 shows a hit in the object cache of the action node. Application thread 90 on action node 50 requests an object. The object is found in object cache 84 in DRAM 22 at the local node, action node 50, that application thread 90 is running on. The cached object may be accessed by the application thread without invoking an SDF thread, and without an access of the object from a remote node.

Figure 13:
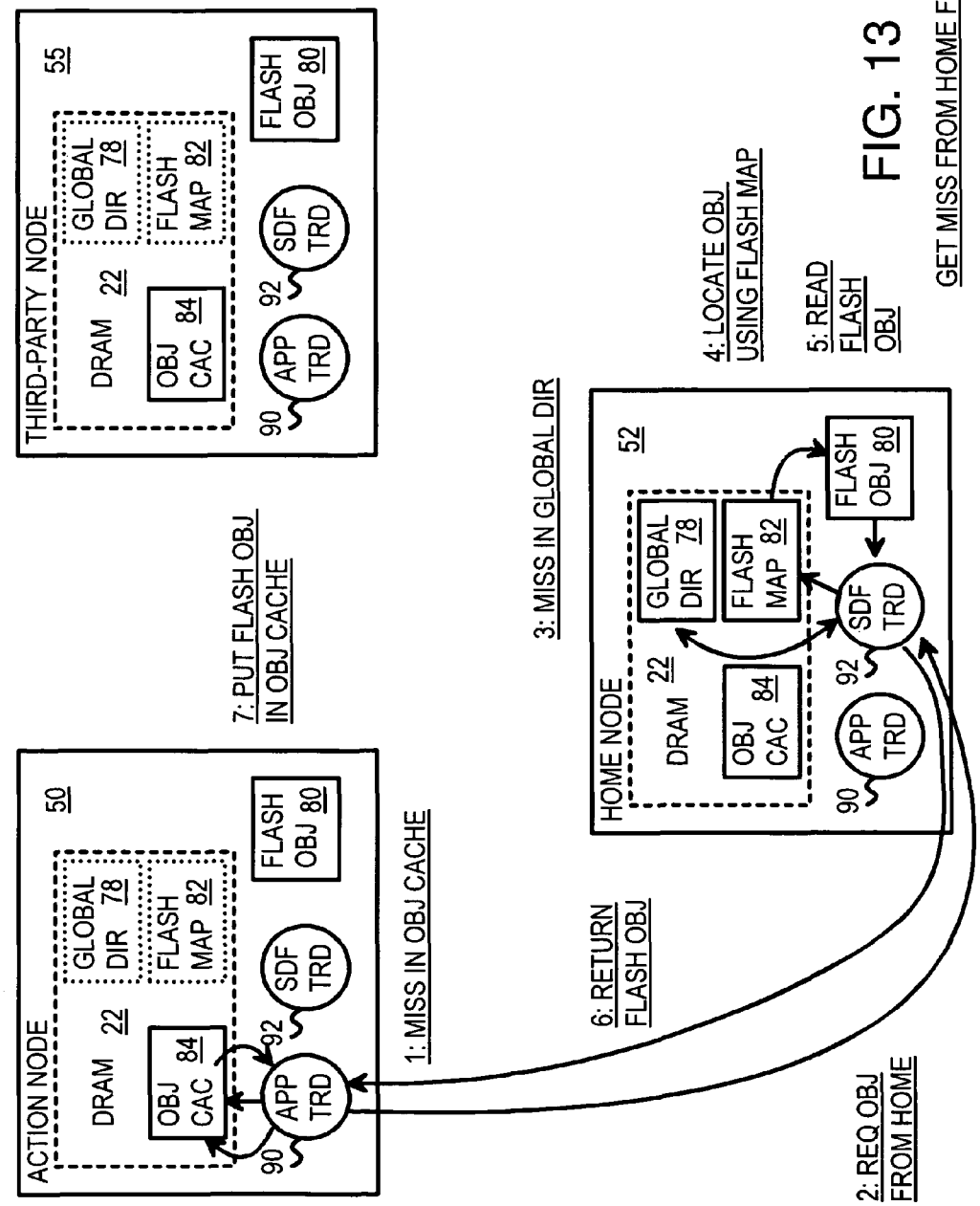
FIG. 13 shows a get operation that misses in the object cache of the action node, and fetches the object from flash memory of the home node.

FIG. 13 shows a get operation that misses in the object cache of the action node, and fetches the object from flash memory of the home node. A miss occurs when application thread 90 checks its local DRAM object cache 84. The node that application thread 90 is running on is referred to as action node 50 since actions are being performed at this node. A request is sent from the action node to the home node for the requested object. The location of home node 52 is determined by action node 50, such as by hashing the name of the object being requested and using the hash as an address in lookup tables. For example, the lookup tables may be a global map from identifiers of the objects to home nodes of the objects.

Application thread 90 uses the address or identifier for home node 52 to send a message to home node 52. This message requests the object from home node 52.

At home node 52, the message received from action node 50 activates SDF thread 92, which looks up the object identifier in global cache directory 78 at home node 52. In this example, no copies of the object have been cached by any other nodes, so a directory miss occurs.

SDF thread 92 running on home node 52 then looks up the object identifier in flash object map 82 to find the address of the object in flash memory 24 of home node 52. Flash memory 24 is read to copy flash object 80 stored in the flash memory of home node 52. A copy of flash object 80 is sent from SDF thread 92 at home node 52 to application thread 90 at action node 50 via an interconnect between home node 52 and action node 50. Application thread 90 (or a SDF miss-handling thread such as SDF thread 92 on action node 50 invoked by application thread 90) then loads the copy of the object into object cache 84 at action node 50. Application thread 90 can resume and read the object copy in its object cache 84.

The asynchronous messaging model of FIG. 10 could be enabled for FIG. 13 by activating a receiving SDF thread 92 at action node 50 when a message returning an object copy is received from home node 52. Then the return arrow would go to SDF thread 92 rather than to application thread 90 at action node 50 in FIG. 13.

In this variation, receiving SDF thread 92 then loads the object copy into object cache 84 of action node 50 and application thread 90 can use the object copy. This handoff using the receiving SDF thread isolates application thread 90 from the details of MPI messaging and may improve robust multi-threaded execution.

Figure 14:
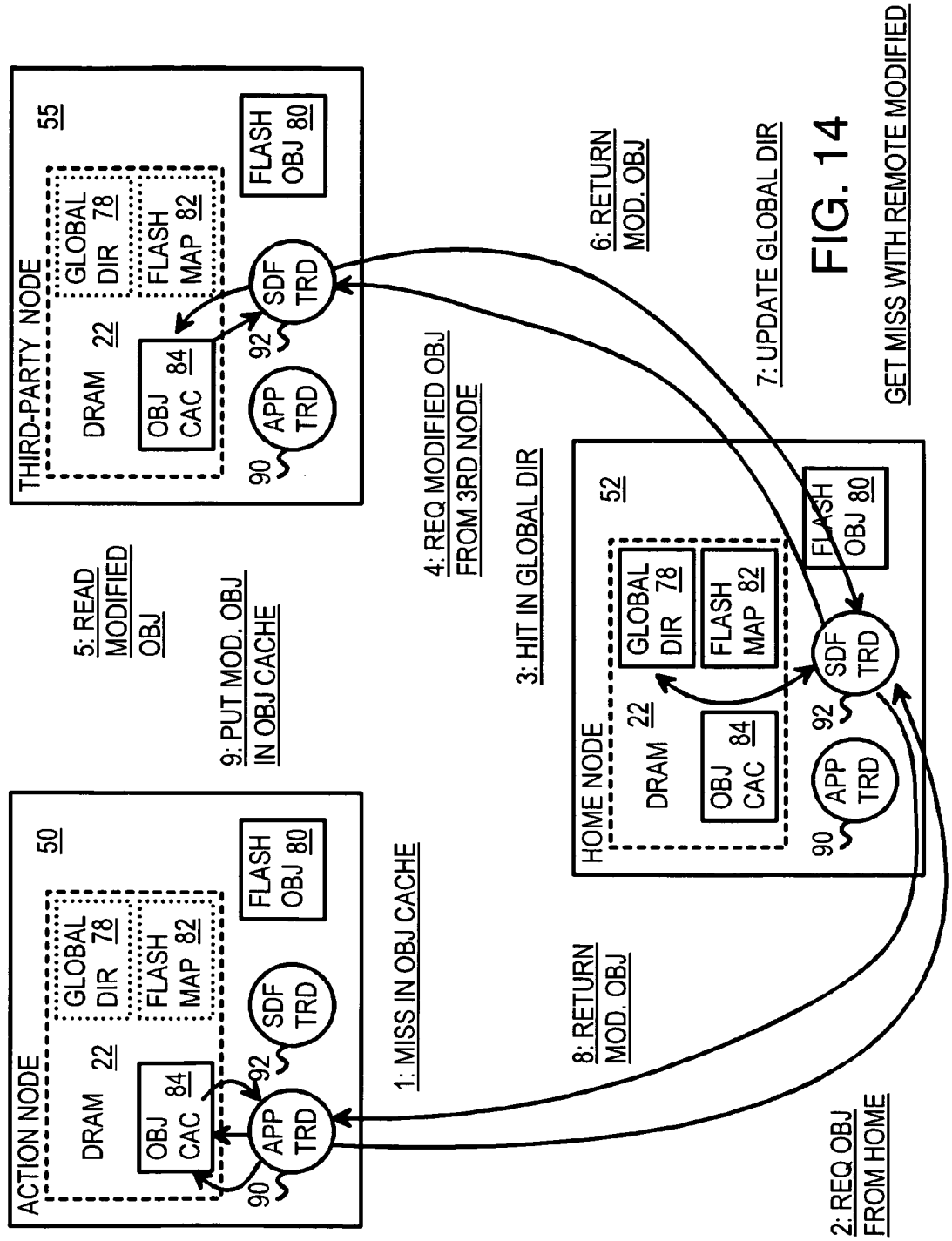
FIG. 14 shows a get operation that misses in the object cache of the action node, and fetches a modified copy of the object from a third-party node.

FIG. 14 shows a get operation that misses in the object cache of the action node, and fetches a modified copy of the object from a third-party node. Application thread 90 on action node 50 misses in its local object cache and sends a message to home node 52. SDF thread 92 in home node 52 finds a match in global cache directory 78 for the object. The object was cached at another node, third-party node 55, and has been modified in this example. Flash object 80 in flash memory of home node 52 is not the most recent version of the object, so the modified version of the object must be fetched from third-party node 55.

At home node 52, the node's address or identifier, virtual node name Vnode, is obtained from global cache directory 78. SDF thread 92 on home node 52 sends a message to third-party node 55, for the object. SDF thread 90 at third-party node 55 reads the object from its object cache 84 and sends the object back to home node 52. The object's state is changed from modified to shared at third-party node 55, and in global cache directory 78 on home node 52.

SDF thread 92 at home node 52 then sends the object to action node 50, where the object is loaded into object cache 84. Global cache directory 78 at home node 52 is updated to refer to the new copy of the object at action node 50. Optionally, home node 52 may store the modified data to the flash memory, over-writing flash object 80.

Figure 15:
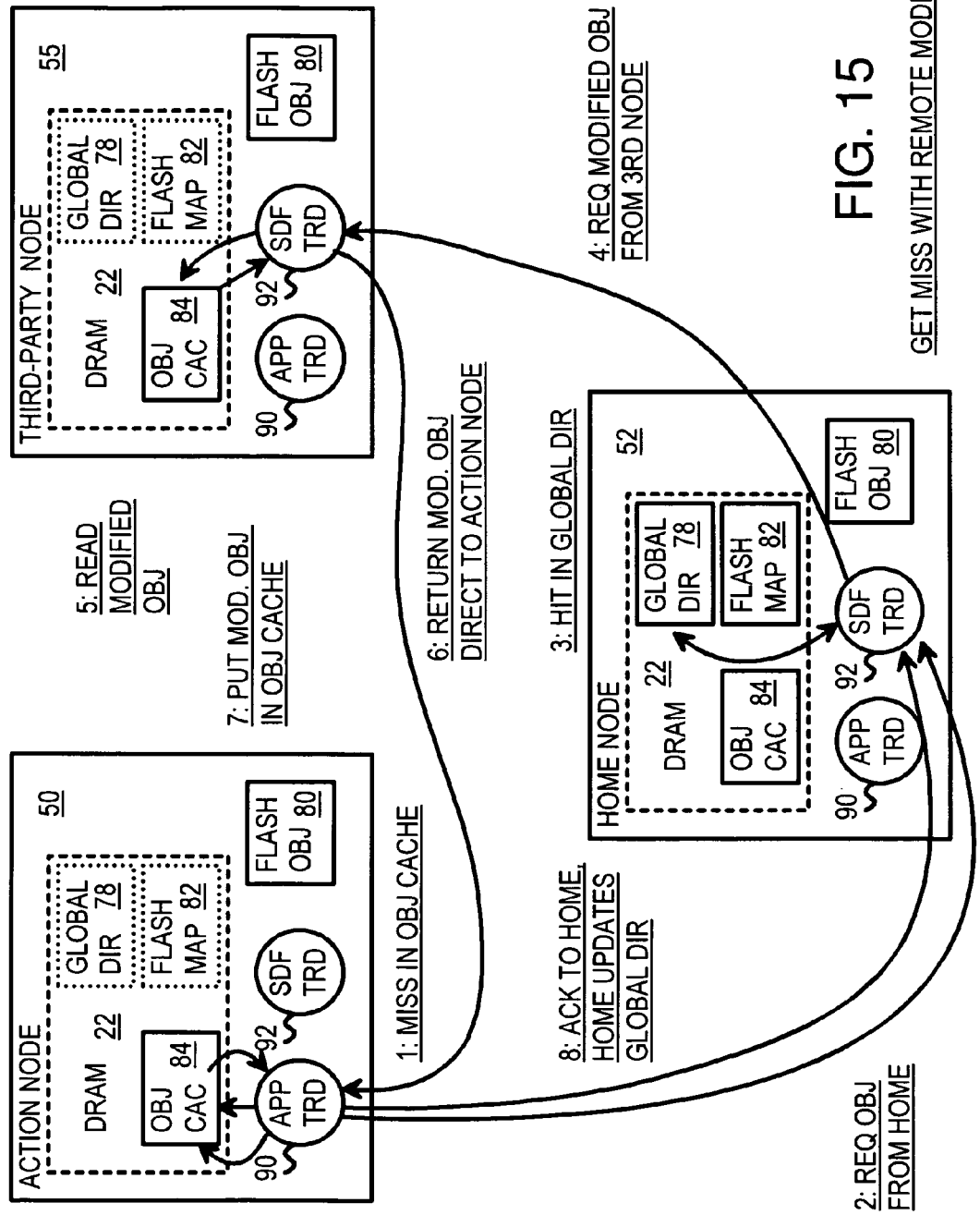
FIG. 15 shows a get operation that misses in the object cache of the action node, and directly fetches a modified copy of the object from a third-party node.

FIG. 15 shows a get operation that misses in the object cache of the action node, and directly fetches a modified copy of the object from a third-party node. FIG. 15 is similar to FIG. 14, however, the modified copy of the object read from object cache 84 of third-party node 55 is sent directly to action node 50 and put into object cache 84 of action node 50.

This direct return of the modified object can allow application thread 90 to resume with less delay, since home node 52 is bypassed on the object return. An acknowledgement message is sent from action node 50 to home node 52 so that home node 52 can update the object's entry from modified to shared in its global cache directory 78, such as to indicate the new cached location and state of the object at action node 50.

When the remote copy of the object at third-party node 55 is not modified, but only shared, the message flow changes somewhat. The object could be read from flash memory at home node 52, but flash reads may be slower than reading the shared copy of the object from the DRAM at third-party node 55. Third-party node 55 reads its shared copy of the object from its object cache 84 and returns the shared copy directly to action node 50 for loading into its object cache 84. Home node 52 also adds action node 50 to the list of nodes with copies of the shared object in global cache directory 78.

Rather than a get request, a put request can also be processed. A put request indicates that application thread 90 intends to write to the object being fetched, rather than just read the object. When the put request from action node 50 misses, it causes home node 52 to request a modified object copy from third-party node 55 if present, as described earlier. Once any locks are resolved, the modified copy in object cache 84 of third-party node 55 is invalidated, since action node 50 will be writing to the object. Home node 52 replaces third-party node 55 with action node 50 in the entry in global cache directory 78 as the object is returned to action node 50 for writing by application thread 90.

If the entire object is going to be over-written, it may not be necessary to send the object from third-party node 55 to action node 50. Action node 50 sends a message to home node 52 indicating that the entire object is to be over-written. SDF thread 92 at third-party node 55 receives a fetch-invalidate request from home node 52. The object copy at third-party node 55 is invalidated as it is being fetched. This atomic operation prevents the modified object from being accessed by other threads at third-party node 55 once the fetch to home node 52 has occurred.

Another example that is not shown in the drawings is a flush at the remote third-party node with the modified object. A flush is sent from home node 52 to third-party node 55. The object is changed from modified to shared on third-party node 55, and the object is sent to home node 52. SDF thread 92 on home node 52 writes the modified copy of the object to the flash memory at home node 52 as flash object 80. Once the flash-write operation is confirmed, SDF thread 92 updates flash object map 82 with the flash memory address. Global cache directory 78 is updated at home node 52 and the modified object is sent to action node 50 for caching and updating as the new modified copy of the object.

A flush may be performed to take a dirty object and put its state into flash memory. A flush may be defined as a method in the API, as well as an internal method in the protocol state-transition. A flushed on a third-party node can happen when (1) a flush( ) API is called, (2) an application or system checkpoint occurs, or (3) a timeout from a flash memory or controller triggers an invalidate or a flush.

A sync operation at action node 50 can also be performed. Application thread 90 checks transient protocol state table 76 (FIG. 11) at action node 50. Once all transient states have acknowledged, application thread 90 can resume execution. If an object is in the S (shared) state, and a write( ) is invoked, the state is in a transient state until the M (modified) state is achieved through the protocol. This synchronizes application thread 90 to all waiting threads at action node 50.

FIG. 16 shows a lock operation. Application thread 90 sends a lock request message to home node 52. SDF thread 92 on home node 52 looks up the object's entry in global cache directory 78 and waits until the object is free and not locked by any other thread on any node. Once the object is free, SDF thread 92 on home node 52 returns the lock to action node 50. An ordered queue may be used to process lock requests at home node 52. In addition to basic mutex-like single state locks, read-write, and upgrade locks, various complex sets of locks may also be implemented (E.g. multi-granularity and hierarchical locks).

When a transaction is started at action node 50 by an application thread, a new entry is allocated in transaction table 74 of FIG. 11 for the new transaction. When a get miss occurs during processing of a transaction, the object is read from flash object 80 at home node 52 as described earlier and loaded into object cache 84 of action node 50. The new entry for the object is updated in transaction table 74 at action node 50. This allows the object to be tracked within a transaction.

To complete a transaction, application thread 90 reads transient protocol state table 76 (FIG. 11) and waits until all outstanding requests for objects touched by the transaction are completed before signaling the completion of a commit operation for the transaction. A list of objects that have been touched (read, updated, or locked) is read from transaction table 74. All modified objects may be flushed. A flush operation causes a cached object to be sent to home node 52 in order to synchronize the most up-to-date state of the object with the source. A flush to the object source in flash-memory provides persistence and a level of durability to the object state. A logged 2-phase commit process may be used for facilitating failure recovery. The objects touched by the transaction are then unlocked, and all entries in the transaction table for the committed transaction are deleted to mark completion of the transaction.

When a transaction is aborted, application thread 90 reads transient protocol state table 76 and waits until all outstanding requests for objects touched (read, updated, or locked) by the transaction are completed. A list of objects that have been touched by application thread 90 performing the transaction is read from transaction table 74. All modified objects are restored to their initial state, which is stored in transaction table 74. The objects in object cache 84 are then unlocked, and any entry in transaction table 74 is deleted to mark completion of the transaction abort.

Alternate Embodiments

Several other embodiments are contemplated by the inventors. For example, while switch 30 has been described in some examples as a PCI EXPRESS switch, in other embodiments local buses could be used, and switch 30 could be a HyperTransport switch rather than a PCI EXPRESS switch. Multi-protocol switches or multiple switches or hubs could be used, such as for supporting HyperTransport and PCI EXPRESS on the same node. Data fabric switch 40, PCI EXPRESS switch 30, and interconnect 110 may have overlapping hardware or software and operate to allow messages to pass for SDF.

While the description above described the global, shared flash memory as being accessible in one global address space, in other embodiments, the global, shared flash memory is accessible in a plurality of global address spaces. For example, in some embodiments, each container is accessible by a respective address space.

Rather than using a local-bus switch, other network topographies could be used, including rings, chains, hubs, and links. Although flash memory has been described, other solid-state memories could be used for storing the objects at the home node (homed objects), such as phase-change memory, ferroelectric random-access memory (FRAM), Magnetoresistive RAM (MRAM), Memristor, PRAM, SONOS, Resistive RAM (RRAM), Racetrack memory, nano RAM (NRAM), and other non-mechanical non-volatile memories. Flash memory uses electrically-erasable programmable read-only memory (EEPROM), although other technologies such as Phase-change-memory (PCM) may be substituted. NAND flash memory may be used to provide advantages in performance, such as write bandwidth, compared to other non-volatile, electronic memory types. Additional levels of storage hierarchy could be added, such as hourly, daily, or weekly backups to disk, tape, or optical media. There could be many flash modules or only one flash module.

The Sharing Data Fabric (SDF) is a unified user-space mechanism to access and store data into hierarchical DRAM, flash memory and the storage sub-system of a clustered or distributed set of compute nodes. SDF uses user-defined attributes to control access, consistency, duplication, and durability of objects in storage. To each application executing on any compute node, the distributed data and storage appears to be logically one big device with integrated cache, memory and storage.

The layers of software and hardware in FIG. 5 may use various combinations of hardware, firmware, middleware, drivers, software, etc. and the layers may be modified in various ways. The connections and interfaces between layers and components may also vary from the simplified diagrams of FIGS. 5, 6.

When transactions are not supported or used, transaction table 74 and transient protocol state table 76 may be omitted. Other tables, lists, or data structures may be used to track SDF operations at the action and home nodes. Tables may contain entries in table format, or as linked lists, or in other formats, and cane be flat, hierarchal, multi-level, or in a variety of other formats. Global cache directory 78 may contain sharing lists with or without other information.

Transient protocol state table 76 in action node state 70 stored in DRAM 22 has entries to track outstanding requests. Rather than storing information on threads, information on contexts may be stored in state table 76. The requesting context, type of request, request status, and order of requests from each context are stored in this table, which is shared by all contexts and their threads at node 100. An indirection of "context" is used to link a sequence of activity of gets, puts, etc. An application thread can use multiple contexts, or multiple threads can use one context. Application threads cannot see any SDF related tables, only SDF protocol threads can. By using contexts, monitoring of what application thread is calling which SDF calls is not needed. This makes the API more flexible.

While an application program requesting an object has been described, other kinds of programs such as networked services, applets, proxies, clients, servers, etc. may request objects and operate in a manner similar to that described for application programs 122. Each node could run one application program such as a server application, or multiple programs of the same or differing types. These programs may themselves perform some caching of data. Some applications or networked services may bypass SDF and reach the network interface directly, or may do so for some kinds of accesses that do not require SDF. Other kinds of API calls and network procedures or calls may be used than those listed in FIG. 6, and additional API functions may be added. Different kinds of messaging between nodes may be employed other than MPI or MPI-like messaging.

While computing nodes have been described as each having a processor, DRAM cache, flash memory, and a NIC, some nodes could be compute-only nodes without any flash memory. Other nodes may have flash memory but do not execute application programs 122. Nodes may have more than one processor, and may have additional memories, such as a read-only memory for program code, static random-access memory (SRAM), or other DRAM. Several levels of processor cache may be present that may keep even more transient copies of objects in DRAM 22. The processor may include one or more processor chips, which each may have one or more processor cores. For example, in some embodiments the processor includes two, quad-core AMD Opteron™ processor chips.

A computing node may have a processor that executes both a web server and a database server application, or a combined application or applet. The compute node may be able to execute several such applications simultaneously, or several threads that can each handle one or more remote user requests. Software may be partitioned or combined in many different ways. In a first example, some or all of the SDF API's are statically linked into an application program. In a second example, some or all of the SDF API's are in a library that is dynamically linked into an application program. In a third example, some or all of the SDF API's are integrated with an operating system. In a fourth example, a stub library is used to replace at least some operating system calls (such as for file operations) with calls to API's in an SDF library.

The NIC may connect to an Ethernet, an InfiniBand, or some other kind of network, or even multiple network types. While two NIC's 36 are shown per node in FIG. 8, one NIC 36 may be used per node, or more than two. Nodes may be asymmetric and have different hardware rather than all be identical. In FIG. 15, the acknowledgement to home node 52 may come from third-party node 55 rather than from action node 50. Other flow modifications are possible. Third-party node 55 may be the same as sharing node 54 in some examples or embodiments.

In some systems, compute nodes may have multiple processors that have separate DRAM caches but share flash memory. Groups of logical compute nodes may use the same physical hardware. One compute node could act as both action node 50 and home node 52 for one object in some of these variations. SDF could send messages between processors on the same compute node that are acting as action node 50 and home node 52.

Direct-memory access (DMA) may be used to transfer blocks of data, rather than using I/O or other instructions by processor 18 (FIG. 4). The terms permanent and transient are relative to each other rather than absolute. Transient objects in DRAM caches may be flushed or copied back to flash periodically, or after a period of no accesses. A permanent object in flash may still be moved from one node to another, or from one flash block location to another at the same node, such as for wear-leveling, data migration, or de-fragmenting purposes. Permanent is meant to imply durability, or retention of data upon power loss, rather than an unlimited life-time of the object.

A particular object may be replicated, so that several copies of the object are located in flash memory of several different nodes. This replication improves reliability since the home node can fail and one of the back-up replica copies may then be used as the home object. At any given time, only one of the replicas may be designated as the permanent object in flash, while the others are kept as backups. The replica copies may provide additional read-only access to the object.

The node chosen as the home node could change over time to spread the wear of the replicas. Multiple replicas could be used as home objects, but for different groups of nodes, so that each group of nodes has only one of the replicas as its home for the object.

While the permanent object has been described as residing in flash memory of the home node, and transient copies of the object have been described as residing in DRAM cache on any node, some classes of object may have varying properties. For example, some objects may be stored primarily in DRAM rather than in flash memory, such as DRAM objects 86 of FIG. 11. Some objects may be DRAM-only objects that are never stored in flash memory. Instead, the permanent object is in DRAM at the home node. Alternately, some objects may not be allowed to be present in DRAM caches, but only in flash memory at the home node. These flash-only objects may be copied to DRAM for a specified short period of time only. Some objects may have time limits for residing in DRAM, or may specify how often they must be copied back to flash memory. The maximum number of shared copies allowed may be specified as an attribute.

Objects are a type of element that can be stored in a container. Elements can be fixed-sized or variable-sized. Variable-sized elements may be termed objects. The description above applies similarly to objects that are fixed-size elements, with some differences such as an ability to access fixed-size elements using, for example, a table look-up (based on an address of the element) rather than a hash (based on a key of the object's name).

To aid consistent distribution and location of data through the clustered or distributed flash-memory system, metadata 88 (FIG. 11) may include an indication of a hash function to be performed on the object identifier to generate an identifier of a unit of storage known as a shard, and an indication of a hash function on the container name to generate a node name. A shard-mapping table maps shard identifiers to nodes (for example, via virtual node names), and another table may be used to map virtual node names to physical node addresses to provide a level of indirection in order to enable dynamic configuration of the distributed flash-memory system. Metadata 88 may be stored in flash memory 24 or may be stored in another memory such as a non-volatile write buffer or a battery-backed memory.

A logged 2-phase commit process may be used for facilitating failure recovery. Recoverable decision and update schemes for a clustered or a distributed system such as 3-phase commit, voting or consensus may be used in place of 2-phase commits.

In addition to the threading model described where each request is handled by a thread, an event based model could also be used where contexts (with state and progress indicators) are maintained for each request utilizing a handful of threads. Application thread 90 in FIG. 13 uses the address or identifier for home node 52 to send a message to home node 52. Alternatively, at any time during processing of an outgoing request, the application thread may hand off the request to the SDF thread, which performs any of the determining or messaging functions on behalf of the application thread.

The word "may" indicates optionally and/or selectively. An object name may be an object identifier, and an identifier can be a name, key or address. A thread is a program or a portion of a program such as a process that may run independently of and concurrently with other portions of the program. Objects are discrete items that may have a state, data, and/or a defined program behavior such as routines or program code that can operate on the data and change the state.

In addition to storing all tables in DRAM, tables could also be stored in a DRAM and flash-memory based hierarchy. Tables could be backed up to flash periodically. Backing up tables to flash memory could be specific to a local node or global. In addition to application thread 90 executing SDF protocols on the action node, SDF may process the protocol on a thread that may process more efficiently and act as a proxy for application thread 90. Such a thread may reside in the application process or in an SDF daemon on the same node. Various arrangements, partitionings, and levels of threads, programs, routines, and applications are possible.

Variations of the cache coherence protocol are possible. A centralized directory-based scheme or various "snooping" schemes may be used. When there is no central directory all caches are "snooped" to determine an action on a cache miss. There are variations of directory schemes in which the directory can be decentralized using a distributed linked list. A distributed hierarchical directory could also be used. A wide variety of cache states and message flows are possible.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto.

We claim:

1. A global shared flash-memory system, comprising:
a plurality of compute nodes, wherein each compute node of the plurality of compute nodes is a distinct physical machine and comprises:
a flash memory for storing homed objects in non-volatile solid-state memory cells;
a processor for executing an application program;
a volatile memory, coupled to the processor, for storing cached objects, wherein the cached objects include copies of remote homed objects stored at remote compute nodes in the plurality of compute nodes, wherein each homed object, including the homed objects stored in the flash memory and the remote homed objects stored at remote compute nodes, has a respective single home node;
a network interface controller (NIC), coupled by a network to other compute nodes, and responsive to the processor, that sends local copies of the homed objects stored in the flash memory to a first compute node in the plurality of compute nodes, and that receives from a second compute node in the plurality of compute nodes remote copies of the remote homed objects stored in the flash memory of the second compute node;
a Sharing Data Fabric (SDF) component executing on the processor, that enables storing the remote copies of the remote homed objects received by the NIC into the volatile memory as the cached objects,
wherein the SDF component stores objects using a single global address space that is also used by SDF components residing on respective other nodes of the plurality of compute nodes,
wherein the application program executing on the processor accesses the cached objects from the volatile memory, including cached objects that are remote copies of the remote homed objects stored in the flash memory of the remote compute nodes in the plurality of compute nodes;
wherein the SDF component is configured to determine the home node for the homed objects; and
wherein the SDF component sends copies of homed objects stored in the flash memory to other compute nodes in the plurality of compute nodes through the network for storage as cached objects in said other compute nodes.

2. The global shared flash-memory system of claim 1, wherein each compute node in the plurality of compute nodes further comprises:
a local switch, coupled to the processor, the flash memory, and the NIC, for allowing the processor to communicate with other compute nodes through the NIC, and for accessing the homed objects in the flash memory to generate the local copies of the homed objects for transfer to the first compute node via the NIC.

3. The global shared flash-memory system of claim 2, wherein the local switch connects to the flash memory and to the NIC using a Peripheral Component Interconnect Express (PCIe) bus; and
wherein the network is an Ethernet network that connects together the plurality of compute nodes.

4. The global shared flash-memory system of claim 1, further comprising:
an applications-programming interface (API) to the SDF component, the API being used by the application program to get a requested cached object that is not present in the volatile memory, the SDF component getting a remote copy of a homed object stored in the flash memory of a remote home node in the plurality of compute nodes and storing the remote copy as the requested cached object for access by the application program;
wherein the application program is not aware that the requested cached object is located at the remote home node, and the application program uses the API to activate the SDF component to transparently retrieve objects from the remote home node.

5. The global shared flash-memory system of claim 1, wherein each compute node in the plurality of compute nodes further comprises:
a plurality of flash memory chips, wherein the flash memory comprises the plurality of flash memory chips;
a plurality of flash controllers that activate the plurality of flash memory chips to read and write flash blocks in the plurality of flash memory chips;
a flash manager for assigning the flash blocks for writing using a wear-leveling scheme to reduce wear of the flash blocks storing the homed objects.

6. The global shared flash-memory system of claim 1, wherein each of the plurality of compute nodes acting as a home node further comprises:
a global cache directory having a sharing list, the sharing list being a list of ones of the plurality of compute nodes storing the cached objects that are copies of the homed objects stored in the flash memory of the home node;
a flash object map being used by the SDF component to locate the homed objects within the non-volatile solid-state memory cells of the flash memory in response to a request for the cached objects from another compute node in the plurality of compute nodes.

7. The global shared flash-memory system of claim 6, further comprising:
coherency means, in the SDF component, for fetching a modified copy of a remote homed object from a sharing node in the plurality of compute nodes identified by the global cache directory, and for sending the modified copy instead of the remote homed object in response to a request for the cached object.

8. The global shared flash-memory system of claim 6, further comprising:
coherency means, in the SDF component, for maintaining coherency of each homed object stored in the flash memory and of the remote homed objects stored at the remote compute nodes in the plurality of compute nodes.

9. The global shared flash-memory system of claim 1, wherein each of the plurality of compute nodes acting as an action node with a requested cached object further comprises:
a transaction table that stores a list of objects touched by a transaction and an initial state for all objects touched by the transaction;
wherein the initial state is a state before the transaction begins;
transaction recovery means for aborting the transaction by restoring the objects touched by the transaction to their initial state stored in the transaction table;
wherein the transaction is a series of operations that are all committed together or all aborted.

10. The global shared flash-memory system of claim 9, wherein each of the plurality of compute nodes acting as the action node with the requested cached object further comprises:
transaction-commit means for committing homed object updates, activated after all operations in the transaction are successfully completed and all prior outstanding requests for objects touched by the transaction are completed;

flash-update means, activated by the transaction-commit means, for sending modified objects touched by the transaction to home nodes in the plurality of compute nodes, the home nodes updating the homed objects in the flash memory using the modified objects with changes from the transaction.

11. The global shared flash-memory system of claim 1, wherein the non-volatile solid-state memory cells consume less power than a rotating disk when writing the homed objects.

12. The global shared flash-memory system of claim 11, wherein the flash memory stores objects as non-volatile data stored in electrically-erasable programmable read-only memory (EEPROM) memory cells or in phase-change memory (PCM) cells.

13. The global shared flash-memory system of claim 1, wherein the flash memory of the plurality of compute nodes collectively are accessible as the global address space.

14. A method for managing a globally shared flash-memory system, the method comprising:

at each compute node in a computer system comprising a plurality of compute nodes, performing operations comprising:

storing homed objects in a flash memory;

storing cached objects in a volatile memory, wherein the cached objects include copies of remote homed objects stored at remote compute nodes in the plurality of compute nodes; wherein each homed object, including the homed objects stored in the flash memory and the remote homed objects stored at remote compute nodes, has a respective single home node;

sending, via a network interface controller (NIC) coupled by a network to other compute nodes, local copies of the homed objects stored in the flash memory to a first compute node in the plurality of compute nodes, and receiving, via the NIC, from a second compute node in the plurality of compute nodes remote copies of the remote homed objects stored in the flash memory of the second compute node; and executing a Sharing Data Fabric (SDF) component to enable storing the remote copies of the remote homed objects received by the NIC into the volatile memory as the cached objects, wherein the SDF component stores objects using a single global address space that is also used by SDF components residing on respective other nodes of the plurality of compute nodes, wherein the SDF component is configured to determine the home node for the homed objects, and wherein executing the SDF component includes sending copies of homed objects stored in the flash memory to other compute nodes in the plurality of compute nodes through the network for storage as cached objects in said other compute nodes.

15. The method of claim 14, wherein each compute node in the plurality of compute nodes further comprises:

a local switch, coupled to the processor, the flash memory, and the NIC, for allowing the processor to communicate with other compute nodes through the NIC, and for accessing the homed objects in the flash memory to generate the local copies of the homed objects for transfer to the NIC for sending to the first compute node via the NIC.

16. The method of claim 15, wherein the local switch connects to the flash memory and to the NIC using a Peripheral Component Interconnect Express (PCIe) bus; and wherein the network is an Ethernet network that connects together the plurality of compute nodes.

17. The method of claim 14, further comprising:

executing an application program, including obtaining a requested cached object that is not present in the volatile memory using an applications-programming interface (API) to the SDF component, the SDF component obtaining a remote copy of a homed object stored in the flash memory of a remote home node in the plurality of compute nodes and storing the remote copy as the requested cached object for access by the application program;

wherein the application program is not aware that the requested cached object is located at the remote home node, and the application program uses the API to activate the SDF component to transparently retrieve objects from the remote home node.

18. The method of claim 14, wherein each compute node in the plurality of compute nodes further comprises:

a plurality of flash memory chips, wherein the flash memory comprises the plurality of flash memory chips;

a plurality of flash controllers that activate the plurality of flash memory chips to read and write flash blocks in the plurality of flash memory chips;

a flash manager for assigning the flash blocks for writing using a wear-leveling scheme to reduce wear of the flash blocks storing the homed objects.

19. The method of claim 14, wherein each of the plurality of compute nodes acting as a home node further comprises:

a global cache directory having a sharing list, the sharing list being a list of ones of the plurality of compute nodes storing the cached objects that are copies of the homed objects stored in the flash memory of the home node;

a flash object map being used by the SDF component to locate the homed objects within the non-volatile solid-state memory cells of the flash memory in response to a request for the cached objects from another compute node in the plurality of compute nodes, whereby the homed objects are located with the flash object map and compute nodes storing the remote copies of the homed objects are located using the global cache directory.

20. The method of claim 19, further comprising:

fetching, in the SDF component, a modified copy of a remote homed object from a sharing node in the plurality of compute nodes identified by the global cache directory; and sending the modified copy instead of the remote homed object in response to a request for the cached object.

21. The method of claim 14, wherein each of the plurality of compute nodes acting as an action node with a requested cached object further comprises:

a transaction table that stores a list of objects touched by a transaction and an initial state for all objects touched by the transaction;

wherein the initial state is a state before the transaction begins;

transaction recovery means for aborting the transaction by restoring the objects touched by the transaction to their initial state stored in the transaction table;

wherein the transaction is a series of operations that are all committed together or all aborted.

22. The method of claim 21, wherein each of the plurality of compute nodes acting as the action node with the requested cached object further comprises:

> transaction-commit means for committing homed object, activated after all operations in the transaction are successfully completed and all prior outstanding requests for objects touched by the transaction are completed;
>
> flash-update means, activated by the transaction-commit means, for sending modified objects touched by the transaction to home nodes in the plurality of compute nodes, the home nodes updating the homed objects in the flash memory using the modified objects with changes from the transaction.

23. The method of claim 14, wherein the non-volatile solid-state memory cells consume less power than a rotating disk when writing the homed objects.

24. The method of claim 23, wherein the flash memory stores objects as non-volatile data stored in electrically-erasable programmable read-only memory (EEPROM) memory cells or in phase-change memory (PCM) cells.

\* \* \* \* \*